United States Patent
Stall et al.

(10) Patent No.: US 8,313,051 B2
(45) Date of Patent: Nov. 20, 2012

(54) PROCESS AND APPARATUS FOR MIXING A POLYMER COMPOSITION AND COMPOSITE POLYMERS RESULTING THEREFROM

(75) Inventors: Alan Stall, Naperville, IL (US); Carl Frauenpreis, Wallingford, CT (US); Tatyana Samoylova, Lowell, MA (US); Hoseok Choung, Middletown, CT (US); Vladimir Sinani, Branford, CT (US)

(73) Assignee: Sealed Air Corporation (US), Elmwood Park, NJ (US)

( * ) Notice: Subject to any disclaimer, the term of this patent is extended or adjusted under 35 U.S.C. 154(b) by 180 days.

(21) Appl. No.: 12/399,010

(22) Filed: Mar. 5, 2009

(65) Prior Publication Data

US 2009/0230223 A1    Sep. 17, 2009

Related U.S. Application Data

(60) Provisional application No. 61/034,078, filed on Mar. 5, 2008, provisional application No. 61/045,617, filed on Apr. 17, 2008, provisional application No. 61/055,436, filed on May 22, 2008, provisional application No. 61/077,398, filed on Jul. 1, 2008, provisional application No. 61/115,244, filed on Nov. 17, 2008.

(51) Int. Cl.
*B02C 19/00*     (2006.01)
(52) U.S. Cl. .................. 241/21; 241/23; 241/260.1
(58) Field of Classification Search ............ 241/23, 241/21, 30, 260, 260.1, 261.1
See application file for complete search history.

(56) References Cited

U.S. PATENT DOCUMENTS

| | | |
|---|---|---|
| 1,084,210 A | 1/1914 | Howard |
| 2,159,670 A | 5/1939 | Neitke |
| 2,453,088 A | 11/1948 | Dulmage |
| 2,591,966 A | 4/1952 | Rider |
| 2,669,750 A | 2/1954 | Keeney |
| 2,753,595 A | 7/1956 | Dulmage |
| 2,838,794 A | 6/1958 | Hiram et al. |
| 2,893,708 A | 7/1959 | Penberthy et al. |
| 2,969,960 A | 1/1961 | Gurley |
| 2,970,817 A | 2/1961 | Gurley |
| 3,006,029 A | 10/1961 | Saxton |
| 3,174,185 A | 3/1965 | Gerber |
| 3,189,325 A | 6/1965 | Levy |
| 3,219,320 A | 11/1965 | Sutter |
| 3,224,739 A | 12/1965 | Schur |
| 3,298,065 A | 1/1967 | Pendleton |
| 3,310,837 A | 3/1967 | Wittrock |

(Continued)

FOREIGN PATENT DOCUMENTS

CA     1313840     2/1993
(Continued)

OTHER PUBLICATIONS

J.H. Schut, "Vibrating-Rotor Compounder Lowers Melt Temperature & Viscosity" Plastics Technology, pp. 45-48, Apr. 2007.

(Continued)

*Primary Examiner* — Mark Rosenbaum
(74) *Attorney, Agent, or Firm* — Daniel B. Ruble

(57) ABSTRACT

An apparatus for, and method of, mixing a molten composition are provided. The apparatus comprises a rotor with flow restrictors supported on its surface and supported within a bore of a casing. The mixer generates at least 100 modulating events as the molten composition flows over the flow restrictors to form a modulated composition.

18 Claims, 23 Drawing Sheets

U.S. PATENT DOCUMENTS

| | | |
|---|---|---|
| 3,333,828 A | 8/1967 | Boehme |
| 3,564,651 A | 4/1968 | Covington, Jr. et al. |
| 3,443,798 A | 5/1969 | Overcashier et al. |
| 3,471,131 A | 10/1969 | Fritzweiler et al. |
| 3,671,141 A | 6/1972 | Kovacs |
| 3,687,423 A | 8/1972 | Koch et al. |
| 3,869,111 A | 3/1975 | Matsuoka |
| 3,989,434 A | 11/1976 | Mercer |
| 3,998,438 A | 12/1976 | Sokolow |
| 4,154,536 A | 5/1979 | Sokolow |
| 4,175,873 A | 11/1979 | Iwako et al. |
| 4,288,398 A | 9/1981 | Lemelson |
| 4,334,783 A | 6/1982 | Suzaka |
| 4,419,014 A | 12/1983 | Gale |
| 4,469,649 A | 9/1984 | Ibar |
| 4,639,143 A | 1/1987 | Frankland |
| 4,659,230 A | 4/1987 | Son et al. |
| 4,687,794 A | 8/1987 | Huddleston et al. |
| 4,692,352 A | 9/1987 | Huddleston |
| 4,695,165 A | 9/1987 | Fukumizu et al. |
| 4,730,935 A | 3/1988 | Kolossow |
| 4,750,842 A | 6/1988 | Huddleston |
| 4,752,136 A | 6/1988 | Colby |
| 4,779,989 A | 10/1988 | Barr |
| 4,793,954 A | 12/1988 | Lee et al. |
| 4,840,492 A | 6/1989 | Nakamura |
| 4,846,659 A | 7/1989 | Nakamura |
| 4,889,430 A | 12/1989 | Mueller |
| 4,897,236 A | 1/1990 | Räbiger et al. |
| 4,908,101 A | 3/1990 | Frisk et al. |
| 4,919,870 A | 4/1990 | Ibar |
| 4,925,161 A | 5/1990 | Alan et al. |
| 4,935,164 A | 6/1990 | Wessling |
| 4,963,033 A | 10/1990 | Huber et al. |
| 5,033,860 A | 7/1991 | Nakamura |
| 5,064,293 A | 11/1991 | Nakamura |
| 5,088,831 A | 2/1992 | Reinhall |
| 5,129,728 A | 7/1992 | Winstead |
| 5,141,328 A | 8/1992 | Dilley |
| 5,158,784 A | 10/1992 | Semmekrot |
| 5,178,458 A | 1/1993 | Hsu |
| 5,202,066 A | 4/1993 | Furusawa et al. |
| 5,221,504 A | 6/1993 | Capelle |
| 5,267,847 A | 12/1993 | Bohm et al. |
| 5,271,876 A | 12/1993 | Ibar |
| 5,290,827 A | 3/1994 | Shine |
| 5,306,129 A | 4/1994 | Ibar |
| 5,310,256 A | 5/1994 | Boden |
| 5,318,357 A | 6/1994 | Colby et al. |
| 5,326,393 A | 7/1994 | Ibar |
| 5,332,314 A | 7/1994 | Geyer |
| 5,344,230 A | 9/1994 | Kowalczyk et al. |
| 5,357,784 A | 10/1994 | Collier |
| 5,375,992 A | 12/1994 | Kruder et al. |
| 5,378,415 A | 1/1995 | Gohlisch et al. |
| 5,407,974 A | 4/1995 | Dallmeyer |
| 5,413,475 A | 5/1995 | Murata et al. |
| 5,451,106 A | 9/1995 | Nguyen et al. |
| 5,453,158 A | 9/1995 | Cummings et al. |
| 5,494,426 A | 2/1996 | Ibar |
| 5,500,172 A | 3/1996 | Derezinski et al. |
| 5,543,092 A | 8/1996 | Ibar |
| 5,605,707 A | 2/1997 | Ibar |
| 5,674,004 A | 10/1997 | Takeuchi |
| 5,688,868 A | 11/1997 | Fish, Jr. |
| 5,770,131 A | 6/1998 | Bubel et al. |
| 5,798,077 A | 8/1998 | Womer et al. |
| 5,816,698 A | 10/1998 | Durina et al. |
| 5,823,673 A | 10/1998 | Müntener |
| 5,885,495 A | 3/1999 | Ibar |
| 5,902,042 A | 5/1999 | Imaizumi et al. |
| 5,932,159 A | 8/1999 | Rauwendaal |
| 5,957,576 A | 9/1999 | Funatsu |
| 6,190,601 B1 | 2/2001 | Nakamura |
| 6,203,747 B1 | 3/2001 | Grunitz |
| 6,207,606 B1 | 3/2001 | Lue et al. |
| 6,210,030 B1 | 4/2001 | Ibar |
| 6,299,342 B2 | 10/2001 | Eggen et al. |
| 6,488,399 B1 | 12/2002 | Womer et al. |
| 6,497,508 B1 | 12/2002 | Womer et al. |
| 6,498,232 B1 | 12/2002 | Guntherberg et al. |
| 6,544,451 B1 | 4/2003 | Heitner |
| 6,550,956 B1 | 4/2003 | Utracki et al. |
| 6,588,925 B1 | 7/2003 | Hilder |
| 6,629,831 B2 | 10/2003 | Wei et al. |
| 6,709,147 B1 | 3/2004 | Rauwendaal |
| 6,992,129 B2 | 1/2006 | Benson et al. |
| 7,135,508 B2 | 11/2006 | Chaiko et al. |
| 7,148,282 B2 | 12/2006 | Giannelis et al. |
| 7,169,886 B2 | 1/2007 | Ibar |
| 7,296,920 B2 | 11/2007 | Zhang et al. |
| 7,304,125 B2 | 12/2007 | Ibar |
| 7,410,697 B2 | 8/2008 | Schneider et al. |
| 7,468,404 B2 | 12/2008 | Ibar |
| 7,615,183 B2 | 11/2009 | Tweed et al. |
| 2002/0060379 A1 | 5/2002 | Wei |
| 2003/0142582 A1 | 7/2003 | Utracki et al. |
| 2003/0201581 A1 | 10/2003 | Weber |
| 2005/0107550 A1 | 5/2005 | Agrawal |
| 2005/0159548 A1 | 7/2005 | Ibar |
| 2005/0182229 A1 | 8/2005 | Ibar |
| 2007/0183254 A1 | 8/2007 | Schobert-Csongor et al. |
| 2008/0251617 A1 | 10/2008 | Sulaiman et al. |

FOREIGN PATENT DOCUMENTS

| | | |
|---|---|---|
| DE | 2026834 | 1/1971 |
| DE | 3132429 | 2/1983 |
| DE | 3200256 | 7/1983 |
| DE | 38 17 234 A1 | 11/1989 |
| DE | 101 32 069 A1 | 1/2003 |
| EP | 0273830 | 7/1988 |
| EP | 0274317 | 7/1988 |
| EP | 0 736 558 A2 | 10/1996 |
| GB | 842692 | 7/1960 |
| GB | 930339 | 7/1963 |
| JP | 57080037 | 5/1982 |
| JP | 57207031 | 12/1982 |
| JP | 4062131 | 2/1992 |
| JP | 5228920 | 9/1993 |
| WO | WO 86/06679 | 11/1986 |

OTHER PUBLICATIONS

Article: The influence of microstructure on the dynamic mechanical behavior of polycarbonate/poly (styrene-co-acrylonitrile) blends. K.W. McLaughlin; Polymer Engineering and Science, vol. 29, Issue 22, pp. 1560-1568 (Nov. 1989).

International Search Report and Written Opinion of the International Searching Authority on International Application No. PCT/US09/041030; Jun. 8, 2009; 7 pgs.

W. Song, "Comprehensive study of a new extensional flow mixer"; Presentation at ANTEC 2000 Conference Proceedings (Orlando FL) on May 10, 2000 (Extensional Flow Mixer, Inc.).

Gramann and Rauwendaal, "New Dispersive and Distributive Mixers for Extrusion and Injection Molding" (Jan. 2000).

M. Tokihisa et al, "Extensional flow mixer for polymer nanocomposites" Polymer Engineering and Science, vol. 46, Issue: 8 (Aug. 2006), p. 1040-50.

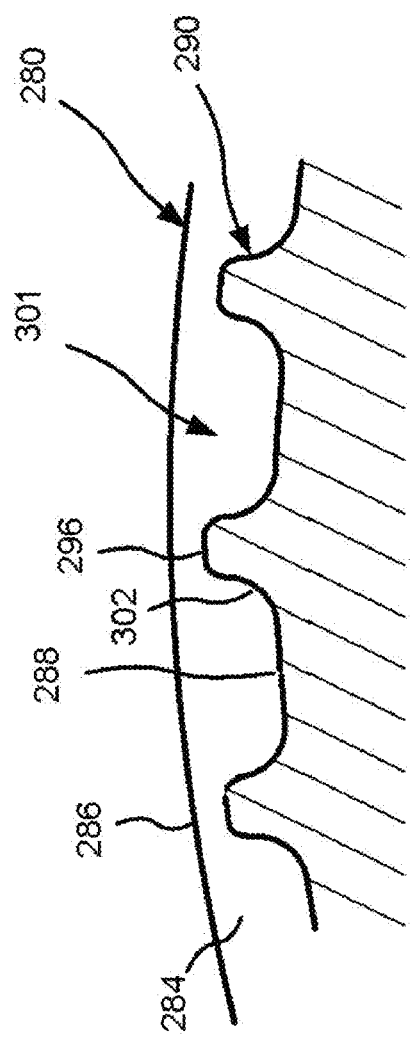
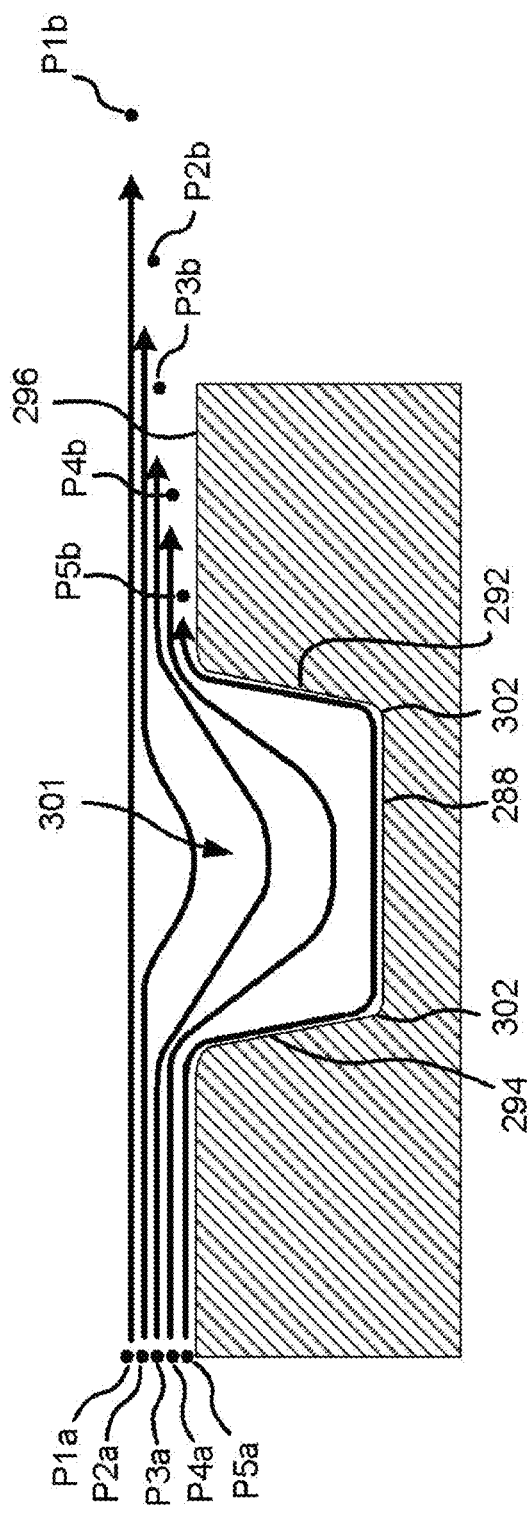
FIG. 3
FIG. 4

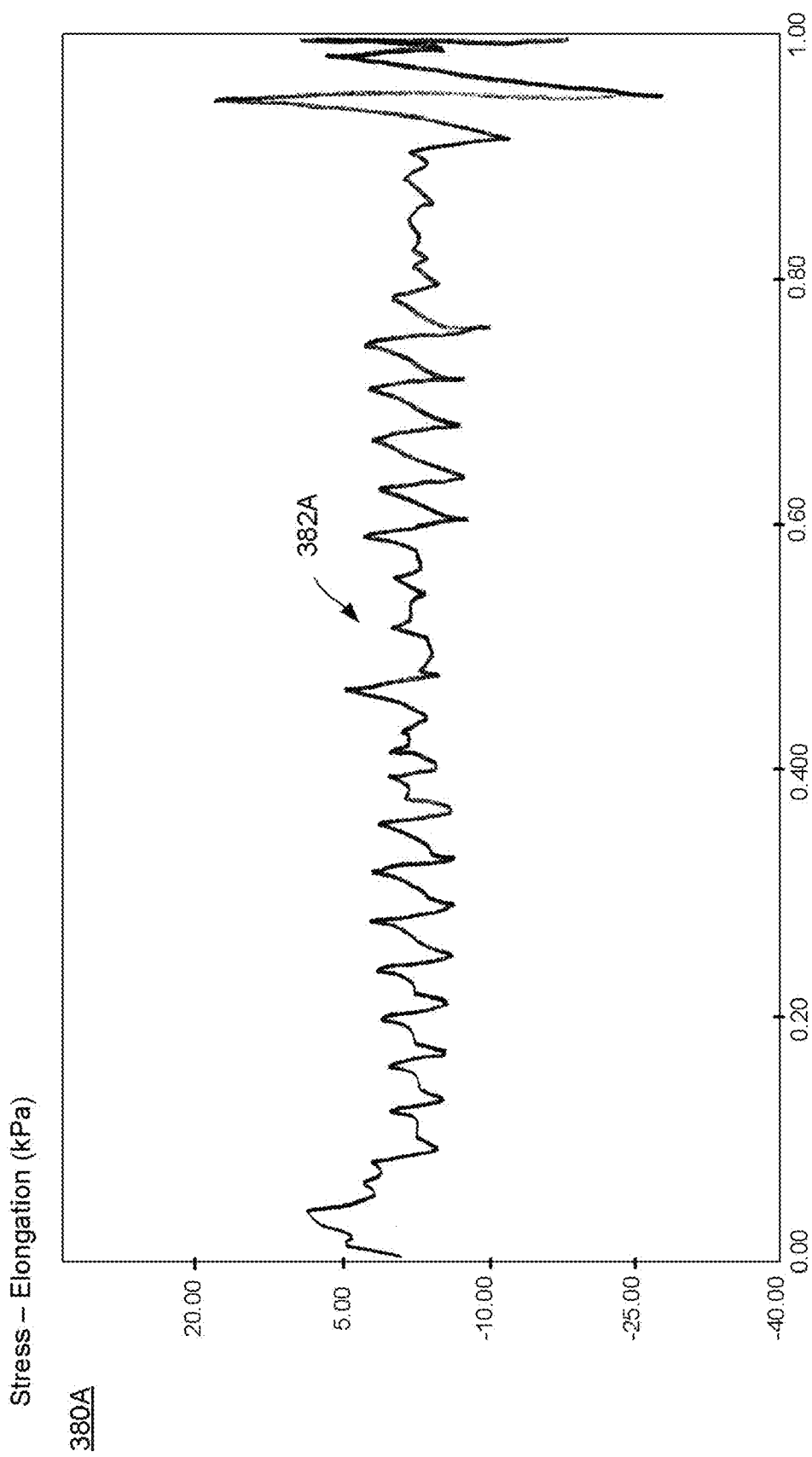

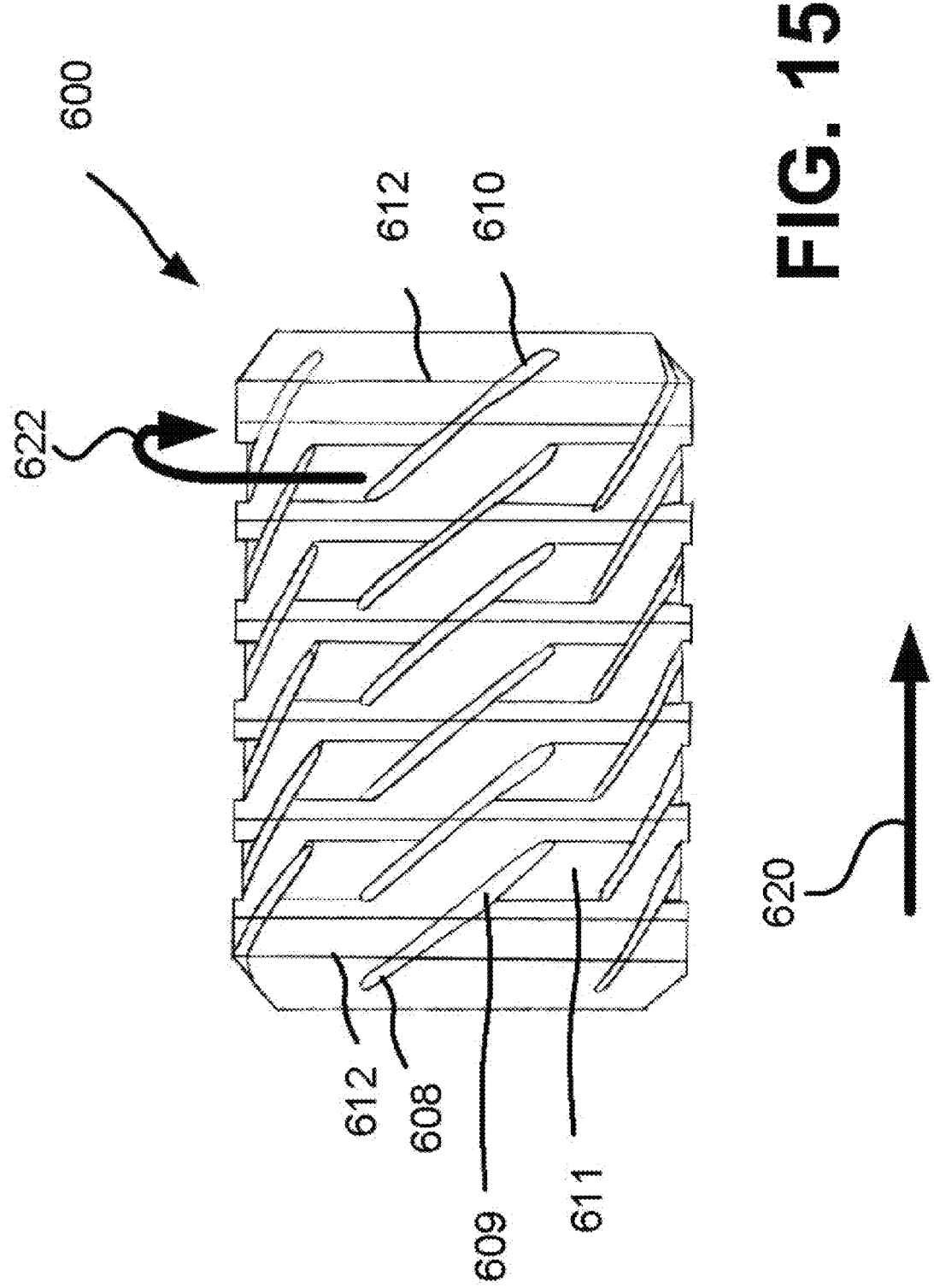

XRD Pattern (from 0.5 to 20 deg, 2θ)

| Sample | 2θ/d-space | 2θ/d-space | 2θ/d-space | 2θ/d-space | 2θ/d-space | 2θ/d-space | 2θ/d-space |
|---|---|---|---|---|---|---|---|
| Nanomer 130P NanoClay | 3.5 (2θ) 24.73 Å | 8.1 (2θ) 10.86 Å | 19.7 (2θ) 4.48 Å | 26.6 (2θ) 3.35 Å | 28.7 (2θ) 3.10 Å | 35.1 (2θ) 2.54 Å | 61.8 (2θ) 1.49 Å |
| Bergamid B70 Nylon | 9.3 (2θ) 9.41 Å | | 12.3 (2θ) 7.14 Å | 20.4 (2θ) 4.34 Å | 23.8 (2θ) 3.73 Å | | 28.5 (2θ) 3.12 Å |
| Nanomer 130P NanoClay + Bergamid B70 Nylon | 9.3 (2θ) 9.41 Å | 10.6 (2θ) 8.29 Å | 12.3 (2θ) 7.14 Å | 20.4 (2θ) 4.34 Å | 23.8 (2θ) 3.73 Å | 26.6 (2θ) 3.35 Å | 28.5 (2θ) 3.12 Å |

FIG. 21 ly, the present invention relates molten polymer mixers.
PROCESS AND APPARATUS FOR MIXING A POLYMER COMPOSITION AND COMPOSITE POLYMERS RESULTING THEREFROM

CROSS-REFERENCE TO RELATED APPLICATIONS

The present Non-Provisional U.S. patent application claims the benefit of priority from commonly owned U.S. Provisional Patent Applications Nos. 61/034,078 filed Mar. 5, 2008, 61/045,617 filed Apr. 17, 2008, 61/055,436 filed May 22, 2008, 61/077,398 filed Jul. 1, 2008, and 61/115,244 filed Nov. 17, 2008, all titled "PROCESS AND APPARATUS FOR MIXING PARTICLES IN A POLYMER MATRIX AND COMPOSITE POLYMERS RESULTING THEREFROM" and expressly incorporated by reference herein in their entirety.

FIELD OF THE DISCLOSURE

The present disclosure relates generally to polymer extrusion machines and processes. More particularly, the present invention relates molten polymer mixers.

BACKGROUND

An extruder is a machine in which material, usually a plastic material, is forced under pressure and often heat to flow through a chamber. The chamber has a feed port and a discharge port. Material flows out of the discharge port into post-extrusion apparatus adapted to further transform the material. Post-extrusion apparatus may include machines adapted to transform the material before it is forced to flow through contoured orifices, typically dies such blown or cast dies, or molding dies, or pipe dies, or pelletizing dies adapted to shape the material before the material solidifies into polymeric articles. Typical extruders include single screw and twin-screw extruders, and also injection molding machines.

Polymers are mixed with a wide range of additives in an extrusion composition to impart various properties to articles made therefrom. Exemplary properties of extruded articles include strength, color, clarity, and cost. Article properties depend in part on the selection of polymers, additives, processing aids, and also on the ability to mix such components into a suitable polymeric compound. As used herein, processing aids means components that are added to a composition for the purpose of improving processing. Exemplary components of extrusion compositions include solid polymers, molten polymers, inert and chemically active particles, powders, fibers, liquids and gases.

Components of an extrusion composition may be pre-blended before and while they are introduced into the extruder, mixed in the extruder, and further mixed in post-extrusion apparatus. Properly mixing particles such as nanoparticles and pigments is challenging in traditional extruders. As used herein, a nanoparticle is an individual particle measuring less than 1,000 nanometers (1 micron) in any one of its dimensions. Due to their size and structure, nanoparticles pose new extrusion mixing challenges. Pigments are also challenging due to their susceptibility to agglomeration and thermal degradation. It is particularly challenging to mix different pigments sufficiently to controllably create shades of colors, e.g., adding yellow and white to blue pigments to create shades of green polymers.

Extrusion mixing is challenging, at least in part, because conventional extrusion apparatus provide a limited number of material transformation controls. Their design implies a trade-off between the need to melt and convey a broad range of materials continuously and the specific mixing requirements of some compositions. As the characteristics of material compositions change, additional control variables may be needed to properly mix such compositions. New controls may be provided in post-extrusion apparatus, before melt solidification, suited to mix new material compositions or to achieve new levels of homogeneity.

SUMMARY

A process and apparatus for mixing a molten polymer composition are disclosed. In one embodiment, the process comprises the step of providing a mixer. The mixer includes a rotor supported within a bore. The rotor comprises a plurality of flow restrictors disposed on its surface in a regulated pattern. The process further includes the steps of providing a molten composition in a pressurized state to the mixer and rotating the rotor to generate at least 100 modulating events as the molten composition flows over the flow restrictors to form a modulated composition.

The features of this invention, and the manner of attaining them, will become more apparent and the invention itself will be better understood by reference to the following description of the disclosed embodiments taken in conjunction with the accompanying drawings.

BRIEF DESCRIPTION OF THE DRAWINGS

FIGS. 3 and 4 are partial and conceptual sectional views of another highly repetitive rotor according to the invention.

FIGS. 8, 8A, 8B, 9, 9A and 9B are graphs depicting modelled elongation stresses of particles moving in a portion of space between a stator and a rotor of a mixing system.

FIG. 15 is a plan view of yet another first stage mixing rotor.

FIGS. 20-21 are a graph and a chart depicting XRD test results obtained from a polymer composite processed according to one disclosed embodiment of a mixing apparatus.

Figure 1:
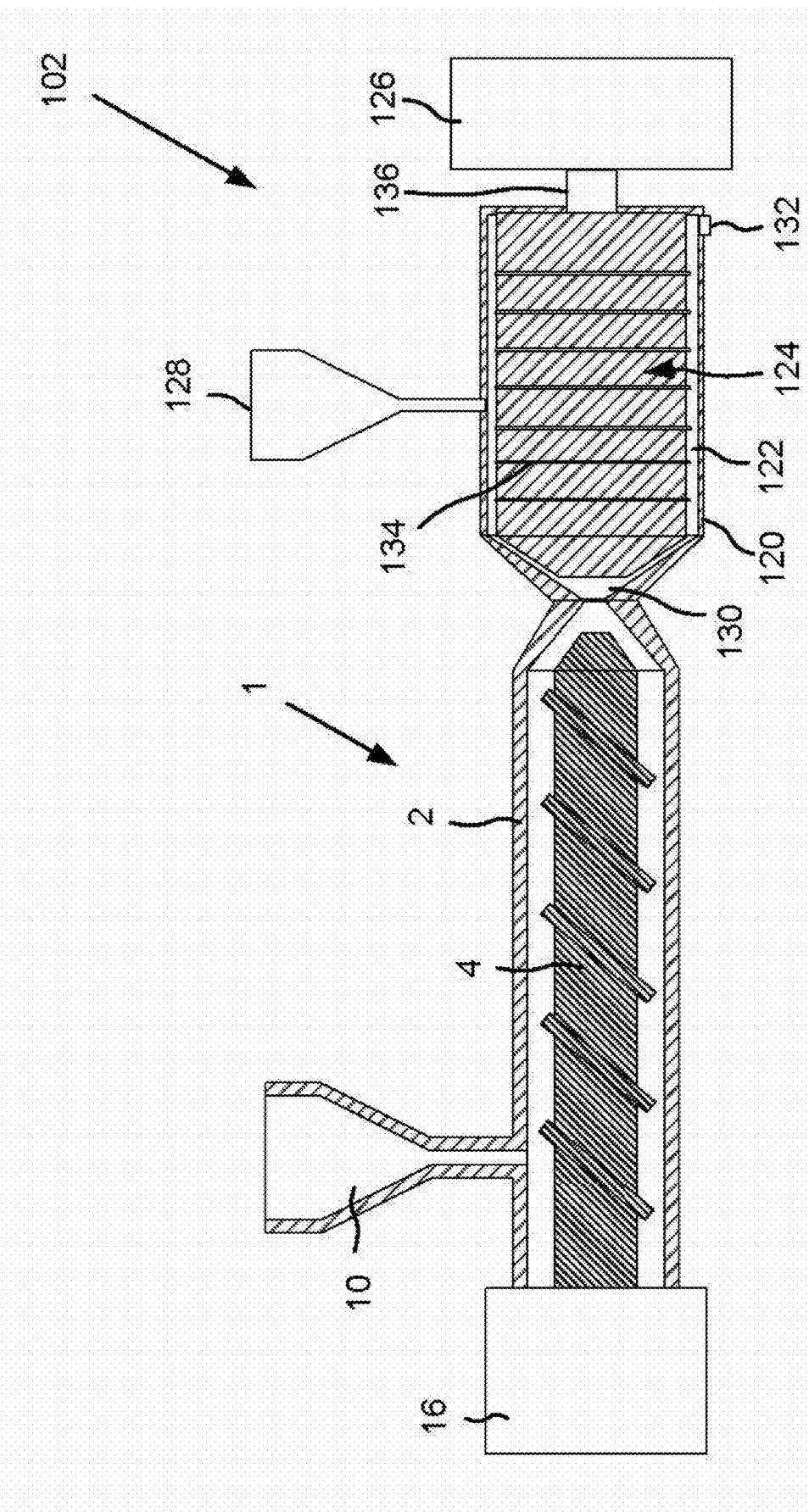
FIG. 1 is a schematic plan view of a mixing system.

Corresponding reference characters indicate corresponding parts throughout the several views. Although the drawings represent embodiments of the present disclosure, the drawings are not necessarily to scale and certain features may be exaggerated to better illustrate and explain the embodiments. The exemplifications set out herein illustrate embodiments of the invention in several forms and such exemplification is not to be construed as limiting the scope of the invention in any manner.

DETAILED DESCRIPTION

The embodiments discussed below are not intended to be exhaustive or limit the invention to the precise forms disclosed in the following detailed description. Rather, the embodiments are chosen and described so that others skilled in the art may utilize their teachings.

Alternative exemplary embodiments of highly repetitive mixing rotors are described hereinbelow. Each rotor comprises a multitude of modulating regions designed to extend and compress a molten composition flowing therethrough. A modulating region is defined by flow restrictors that modulate polymer velocity and shear stress to create low shear extension/compression cycles defined as "events". After extensive experimentation and 3D modelling, the inventors discovered that improved mixing is achieved by repeatedly modulating the molten composition under low shear conditions. Compositions comprising colorants, nanoclays, and other additives mixed according to the novel method described herein show improved results such as reduced variation, equal functional levels with reduced additive concentrations, and equal or less degradation than may be found in known mixers.

FIG. 1 is a plan view of an illustrative embodiment of a mixing system comprising extruder 1 and extensional flow mixer 102. Extruder 1 provides a pressurized molten composition to mixer 102 which provides dispersive and distributive mixing that increases the homogeneity of the molten composition. Dispersive mixing reduces particle sizes, and exfoliates nanoclay particles. Homogeneity, or uniformity, contributes to uniform article attributes such as physical and chemical properties, appearance, subsequent processing behavior, and performance. Additive concentration, polymer melt history, temperature, exfoliation, intercalation and viscosity are exemplary characteristics of a melt composition that may be homogenized, or made more uniform, by the two-stage mixer of the invention. Extruder 1 comprises barrel 2, screw 4, and feeder 10 through which material compositions delivered to feeder 10 enter barrel 4. Barrel 2 comprises a bore adapted to receive screw 4 and create a gap therewith. Motor 16 causes screw 4 to rotate. As it rotates, screw 4 melts and mixes the composition and causes it to flow out of extruder 1 and into mixer 102.

Extensional flow mixer 102 comprises a stator, barrel or casing 120 having bore 122 therethrough, and rotor 124 rotatably supported within bore 122 and operably coupled by shaft 136 to driver 126 which rotates rotor 124. The gap is the distance between the surface of rotor 124 and the inner surface of bore 122. In one embodiment, the gap is constant and ranges between 0.3 mm and 5.0 mm, preferably between 0.4 and 2.0 mm, and more preferably between 0.5 and 1.5 mm. Casing 120 comprises feed port 130 and discharge port 132 which are in fluid communication with bore 122. Thermally sensitive material and other additives may be introduced through feeder 128.

Driver 126, illustratively a motor electrically connected to a motor drive, is adapted to rotate rotor 124 at the same or different speed from the speed of screw 4. The motor drive comprises controls adapted to regulate a relationship between the speed of rotor 124 and screw 4. In one embodiment, rotor 124 rotates faster than screw 4. In one embodiment, the maximum rotational speed of screw 4 is between 100 and 120 revolutions per minute, and the maximum rotational speed of rotor 124 is between 300 and 350 revolutions per minute. Rotor 124 has a plurality of modulating regions disposed on its surface which is described below with reference to FIG. 2. The molten composition flowing through mixer 102 is repeatedly modulated as portions of the molten composition flow through the modulating regions.

As will become evident with understanding of the modelling techniques described below with reference to FIGS. 5-7, extensional flow mixers may be constructed with highly repetitive modulating regions with designs of different characteristics. Each design may be optimized for particular polymer compositions and operating conditions. Once flow-paths are determined, modulating regions which intersect flow-paths perpendicularly can be designed. Depending on the characteristics of the polymer composition, it may be desirable to provide flow restrictors in simple patterns, such as without helical or annular walls, when the cost of adding helical or annular walls to separate modulating regions from each other is not justified in view of the efficiency gains obtained by providing such helical or annular walls. In other words, the modulating regions may be sufficiently efficient through proper angling and width optimization that additional efficiency is not cost effective. In the exemplary embodiment of FIG. 1, a cylindrical rotor is provided with flow restrictors disposed parallel and perpendicular, e.g. restrictors 134, to the longitudinal axis of the rotor. In another embodiment, slot walls form restrictors 134 and no additional helical or annual walls are provided. In another embodiment, bore 122 and rotor 124 exhibit frustoconical shapes tapering from a small to a large diameter, wherein the small diameter is disposed upstream of the large diameter. In another embodiment, rows of modulating regions, or pockets, are provided, for example by an engraving or surface etching, wherein each pocket has two long walls and two short walls and the pockets are aligned in a rectangular pattern. In yet another embodiment, rows of spaced walls are provided perpendicular to flow restrictors 134 which, except for the wall spacings, are identical to the modulating pattern provided in rotor 124.

Figure 2:
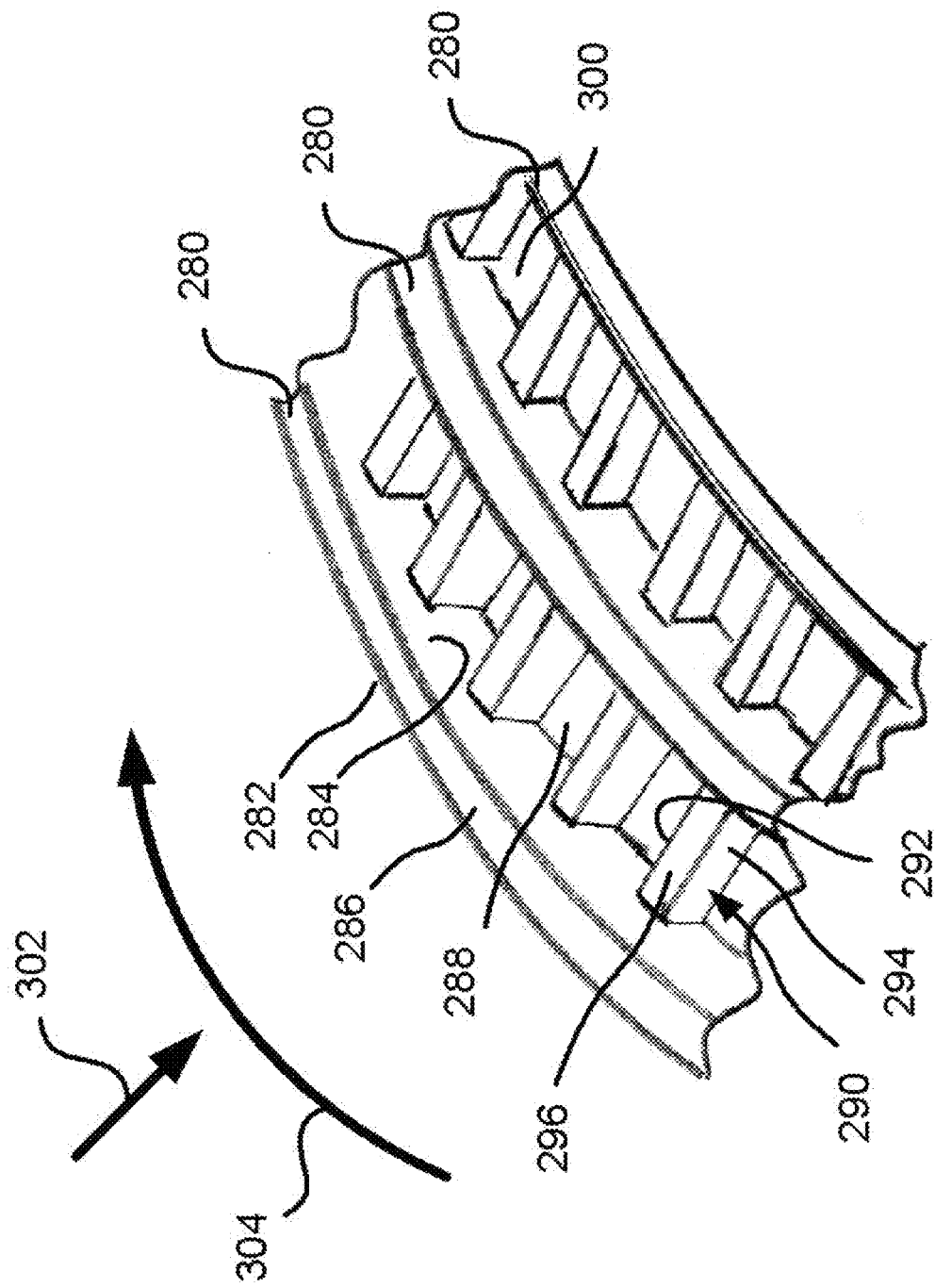
FIG. 2 is a partial perspective view of a highly repetitive rotor according to the invention.

FIG. 2 is a perspective view of a portion of an illustrative embodiment of modulating regions 300 of rotor 124. Modulating regions, or pockets, 300 are defined by restrictors, e.g. walls 280 and pocket walls 290 extending therefrom, and pocket bottoms 288 disposed between pairs of pocket walls 280 and 290. Wall 280 comprises first and second spaced apart surfaces 282, 284 and a top surface 286 therebetween. First and second surfaces 282, 284 define a wall thickness and a wall depth equal to the distance from top surface 286 to pocket bottoms 288. Pocket walls 290 have leading and trailing spaced apart surfaces 292, 294 defining a pocket wall thickness and a top pocket wall surface 296 therebetween. Leading and trailing surfaces 292, 294 define a pocket wall height equal to the distance from top pocket wall surface 296 to pocket bottoms 288. Arrow 302 indicates the direction of molten composition flow and arrow 304 indicates the direction of rotation. The height of walls 280 and 290 may be equal or different. In one embodiment, all walls 290 have equal heights. In another embodiment, rotor 124 is tapered so that its diameter increases slightly from upstream to downstream and the heights of walls 290 decrease from upstream to downstream, thereby maintaining a constant gap as pockets become shallower. In an exemplary embodiment, pocket depths are between 0.1 and 1.0 mm and pocket wall thicknesses are about 0.75 mm. More or less pockets may be disposed on the surface of rotor 124 depending on the flow restrictor characteristics, rotor 124 diameter and length, and rotation speed, wherein the four factors are combined to result in at least about 100 events. In one embodiment, there are 1,800 pockets 300 disposed on rotor 124, all having substantially the same length, and pocket widths range from about 0.5 mm to about 8 mm, and more preferably between 1 mm and 5 mm. In one embodiment, the depth of pockets 300 is constant. In another embodiment, the depth of pockets 300 varies from about 0.50 mm on the upstream end to about 0.200 at the downstream end to gradually reduce agglomeration and particle size. Bore 122 may comprise a smooth surface and may also comprise a modulating surface of modulated regions provided in a similar manner as those provided on the above-described rotors. In one embodiment, a helical wall disposed on the surface of bore 122.

In alternative embodiments, modulating regions may comprise restrictors which differ geometrically from walls 290. In one embodiment, restrictors are similar to pocket walls 290 except that they are partially or fully detached from walls 280. In another embodiment, restrictors comprise protrusions extending radially from the rotor. Protrusions may exhibit cross-sectional surfaces with circular, diamond, square, hexagon, octagon and other shapes, and may comprise a plurality of protrusions disposed in regulated patterns such as linear, orthogonal and hexagonal patterns.

Extensional flow mixing is achieved in two steps. A molten composition is provided to an extensional flow mixer constructed according to teachings provided herein, and the molten composition is then exposed to at least 100 events. Due to the lower energy input of extensional mixing, process temperatures may be reduced by at least 20 degrees Celsius below the melt temperature of the molten composition provided in the first step to increase the mixing stresses and prevent or reduce thermal degradation.

FIGS. 3 and 4 are partial cross-sectional views of another embodiment of a modulating rotor. Pockets 301 are shown having pocket walls 290 including leading and trailing surfaces 292 and 294, respectively, and pocket bottoms 288. Pockets 301 include fillets 302 which round pocket bottoms 288, thus reducing or preventing stagnation of molten polymer on the periphery of pocket bottoms 288. Fillets 302 are also provided at the intersections of pocket bottoms 288 and helical walls 280. Fillets may also be provided on pockets disposed on the surface of bore 122. Fillets may have a radius of between 0.010 and 0.100 inches. More preferably, fillets may have a radius of between 0.020 and 0.050 inches. In one embodiment, the fillet radius on pockets disposed on the surface of a mixing element are smaller than the fillet radius of pockets disposed on the surface of a corresponding bore.

FIG. 4 illustrates the behavior of five particles P1-P5 as they travel over pocket 301 and illustrates the fundamentals of a modulating event. The initial position of particle P1 is denoted as P1a and the final position is denoted as P1b. The positions of the remaining particles are similarly denoted. Particle P1 illustrates a short travel path through pocket 301 and particle P5 illustrates a long travel path. Since the particles are part of the same molten polymer matrix, the difference in travel paths causes the particles to separate spatially resulting in shearing and expansion, and subsequently as the particles cross over surface 296, in compression. The multiplicity of expansion/compression events, or cycles, result in distributive mixing. As polymer gently moves through a multiplicity pockets, substantially all of the polymer experiences distributive mixing thereby resulting in well mixed polymer. The flow path of each particle, e.g. P1-P5 may be modelled and the results combined to obtain an average "experience" of a molten composition flowing through a modulating region. Referring to FIG. 4, position P5a is defined as a 0% position, signifying that particle P5 contacts surface 296, and position P1a is defined as a 100% position, signifying that particle P1 is in contact with the surface of bore 122. Positions P4a, P3a, and P3a represent, respectively, 25%, 50% and 75% positions consistent with their placement between particles at the 0% and 100% positions. While particles may be advantageously mixed in a method disclosed herein, and the understanding of the movement of particles is easily conveyed, the method is also applicable to molten compositions comprising fluids and gases which are not particulate matter. Therefore, the apparatus and method disclosed herein may be described in the context of dispersing solid or fluid molecules rather than using the more narrow term "particles".

Figure 5:
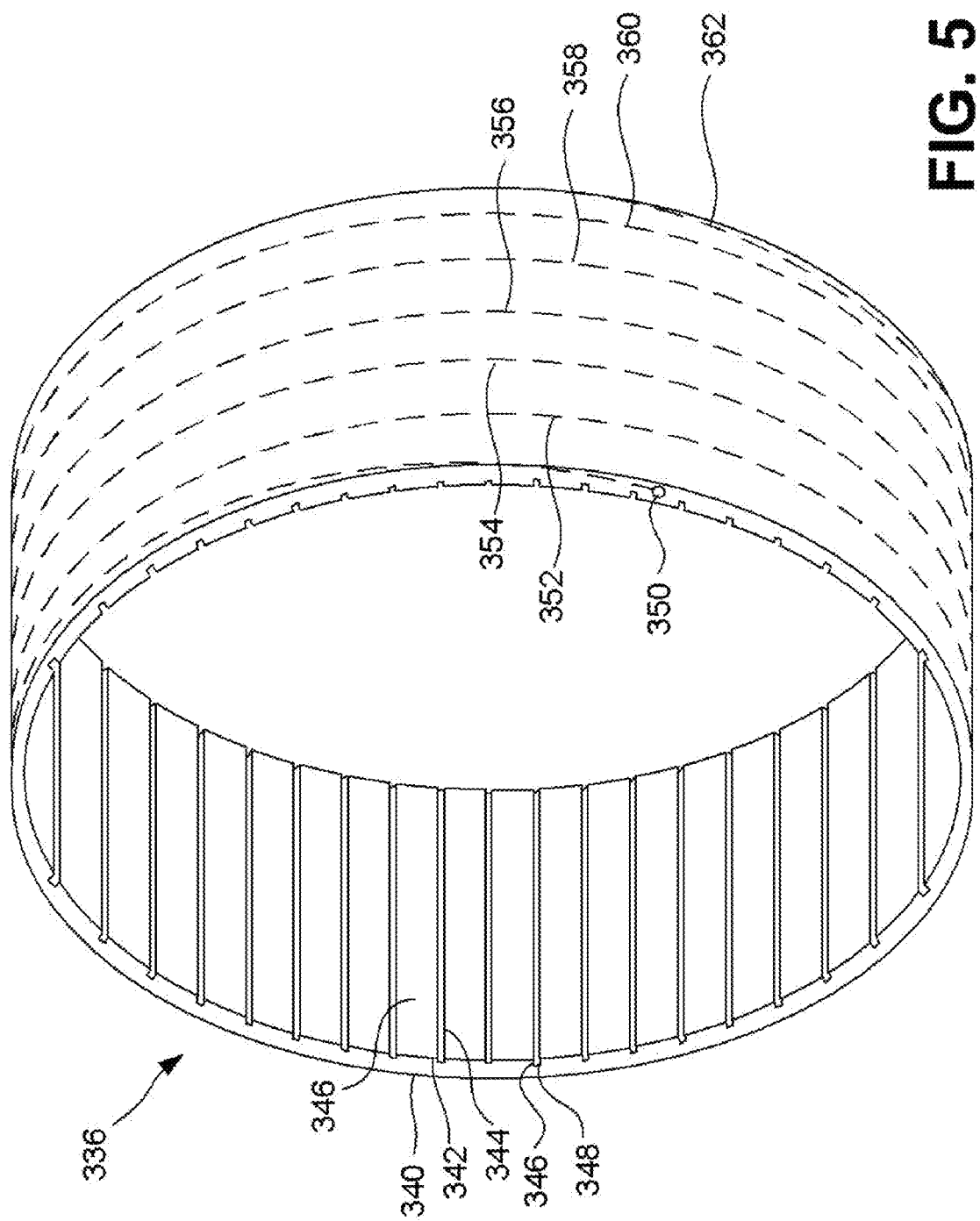
FIGS. 5, 6 and 7 are perspective views of a 3D model of a portion of space between a stator and a rotor of a mixing system.

FIG. 5 is a perspective view of a 3D model of a portion of space between a stator and a rotor of a mixing system illustrating the behavior of a particle as it travels in the modelled space. The polymer flow space inside the mixer, illustratively model 336, was simulated with COMPUPLAST 3D Finite Element Method (FEM) software available from Compuplast Canada, 5333 Forest Hill Dr., Mississauga, ON L5M 5B7 Canada. The computer software simulation inputs include the dimensional geometry of the polymer flow space in the mixer, the rheological properties of the molten composition, temperatures and flow rates. The software outputs graphical and numerical data which describes the conditions a particle experiences as it travels through the mixer including a 3D model of the particle path, elongational stress, shear stress and velocities. These parameters are important for characterizing mixing.

Sections of cylindrical mixer 240 were modelled to estimate the number of events needed to achieve improved mixing. Model 336 has a continuous circumferential external surface 340 representing the internal surface of a cylindrical bore, a plurality of rectangular surfaces 338 representing bottom surfaces of a plurality of pockets and a plurality of slots 344 representing negative images of a plurality of pocket walls. Slot 344 has a side surface 346 and a bottom surface 348 disposed parallel to surface 338. The axial distance between bottom surface 348 and external surface 340 relates to the amount of shear experienced by a molten composition as it moves between pocket walls and the inner surface of the bore. The length of a pocket is represented by the length of surface 338.

Once the model of the space is defined, the software simulates the flow path of particles. The flow path depends on where the particles are placed in the model as well as the geometry of the mixer. The flow path of a particle, illustratively particle 350, is shown. Particle 350 is shown entering model 336 and travelling between surfaces 338 and 340 in an elliptical flow path which goes around model 336 six times, each time around represented by a partial flow-path line. The first partial flow-path line starts with the introduction of particle 350 and ends when the particle completes 360 degrees of travel around the axis of the model. Partial flow-path lines 352, 354, 356, 358 and 360 identify, respectively, the other five partial flow-path lines. Partial flow-path line 360 ends at 362 when the particle exits model space 336.

This flow-path analysis provides information on the distribution of model output parameters as well as a more representative average of the polymer's melt history. As a molten composition passes over pocket walls it experiences a modulation in shear stress and extensional stress corresponding to changes in gap distances and particle velocities. The particle paths and the number of pockets in the mixer can be used to estimate a minimum number of modulations, or events, experienced by the molten composition. The number of events experienced by a particle along a flow-path is equal to the number of pockets crossed by the flow-path times the number of times the flow-path crosses each pocket. The residence time of a portion of a molten composition in the mixer depends on the speed of the rotor, gap distance, characteristics of the composition, temperatures and pressures, and through-put of the feeder extruder. The portion of the molten composition will experience few events or many events with high or low, respectively, residence time. In an exemplary embodiment, an average number of events is calculated by simulating the flow path of nine particles, calculating the number of events experienced by each particle, and then averaging the number of events at each position and adding the averages to obtain an average number of events for the mixer at the given operating conditions. Particle flow-paths may be modelled at various longitudinal and particle positions to account for mixer diameter differences and for flow differences due to composition and processing conditions.

The following example illustrates the calculation described above. In this example, the rotor is cylindrical and has the same diameter along its length. A particle starts a flow path by crossing over a circumferential wall and then moves over 5 pockets before it exits over of the opposite wall. The pocket length is 9 mm and the annular wall have a 1 mm width therefore the particle experiences, on average, 5/10 events/mm. A 200 mm long rotor would generate 100 modulations. In another example, the rotor is frustoconical and has a helical wall extending from end at a 10 degree angle.

In this example, the geometry of the mixer is modelled in three sections by calculating events at 50%, 75% and 100% axial locations. These positions were selected for convenience and different positions may be selected. There are 18 rows of pockets in the first section and 9 rows in each of the other two sections. Events at 25%, 50%, and 75% particle gap positions are calculated as well and averaged. The calculations, shown below, result in 324+216+240=780 events. The polymer and processing conditions are described with reference to Example 8, samples D and F. The number of events increase with the diameter of the mixer and particles near the rotor experience fewer events compared to the others.

| Particle location | Rows | Events per row | Events per section | Average events per section |
|---|---|---|---|---|
| 50% Axial Location | | | | |
| 25% | 18 | 26 | 468 | |
| 25% | 18 | 26 | 468 | |
| 50% | 18 | 17 | 306 | |
| 75% | 18 | 11 | 198 | |
| | | | | 324 |
| 75% Axial Location | | | | |
| 25% | 9 | 32 | 288 | |
| 50% | 9 | 23 | 207 | |
| 75% | 9 | 17 | 153 | |
| | | | | 216 |
| 100% Axial Location | | | | |
| 25% | 9 | 41 | 369 | |
| 50% | 9 | 23 | 207 | |
| 75% | 9 | 16 | 144 | |
| | | | | 240 |

If the rotor speed increases sufficiently and everything else remains constant, the number of events will increase also since the rotor slips faster on the polymer composition exposing more pockets before pressure pushes the polymer composition forward to the next row of pockets. The reverse is also true. Consequently, from a productivity stand-point, a conflict arises as improved mixing (more events) would require more residence time (slower through-put) and increased through-put would result in reduced mixing. Pocket dimensions may be optimized to provide the appropriate number events and sufficiently low shear at each event to mix properly and quickly without degrading the polymer. More sophisticated models can be developed which integrate a number of variables to increase precision. For instance, the model could predict modulations of a multitude of particles.

The model could also include a refined geometric description of the entire mixer, section by section. Additional refinements may be possible such as multiple temperature and pressure settings and the like.

Figure 6:
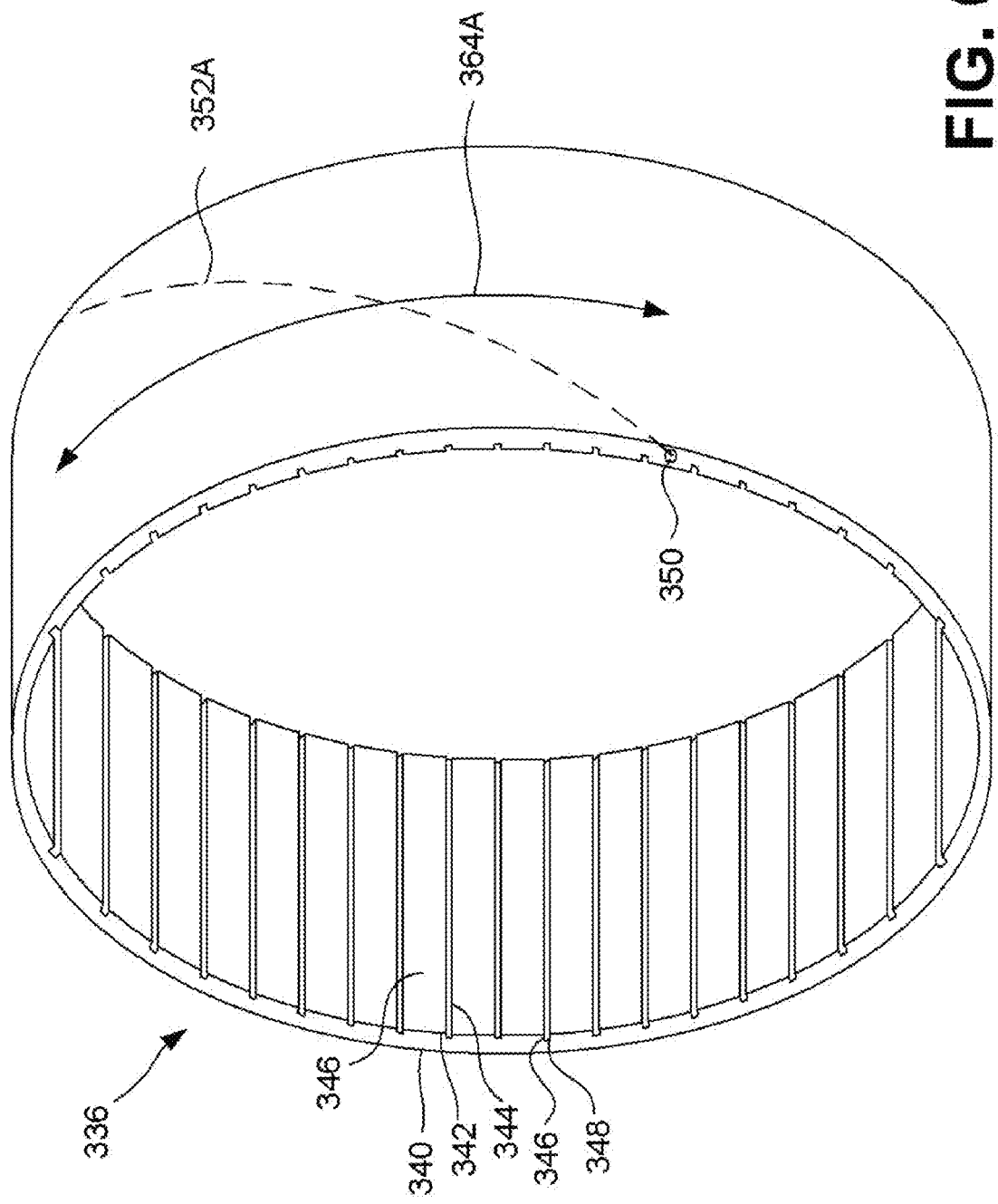
Figure 7:
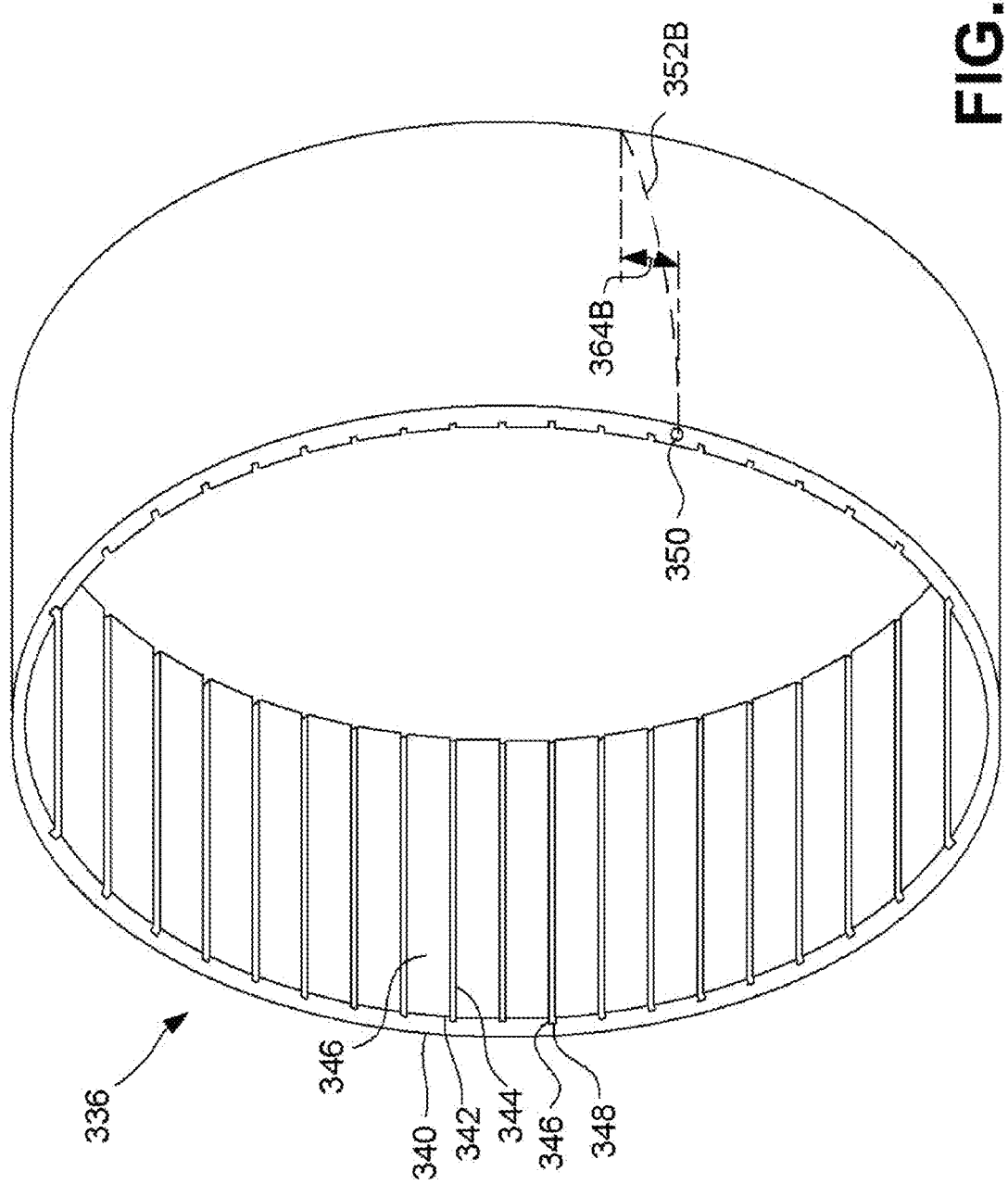

FIGS. 6 and 7 are perspective views of model 336 illustrating the behavior of a particle as it travels in the modelled space at two slower rotor speeds. FIG. 6 illustrates flow-path 352A which is less than one path around the rotor, and line 364A is provided perpendicularly to surfaces 346 for convenience to facilitate counting surfaces 346. The length of line 364A is proportional to the number of pockets crossed. Line 364A crosses 12 pockets. Similarly, FIG. 7 illustrates flow-path 352B and a very short line 364B which crosses the width of only one pocket (although it does not entirely cross over a pocket, it is considered to do so because line 364B is longer than the pocket width and because the particle also crosses over a pocket wall). Under the operating conditions represented in FIG. 6, the mixer would generate 36×12=432 events. Under the operating conditions represented in FIG. 7, the mixer would generate 36×1=36 events.

Figure 8:
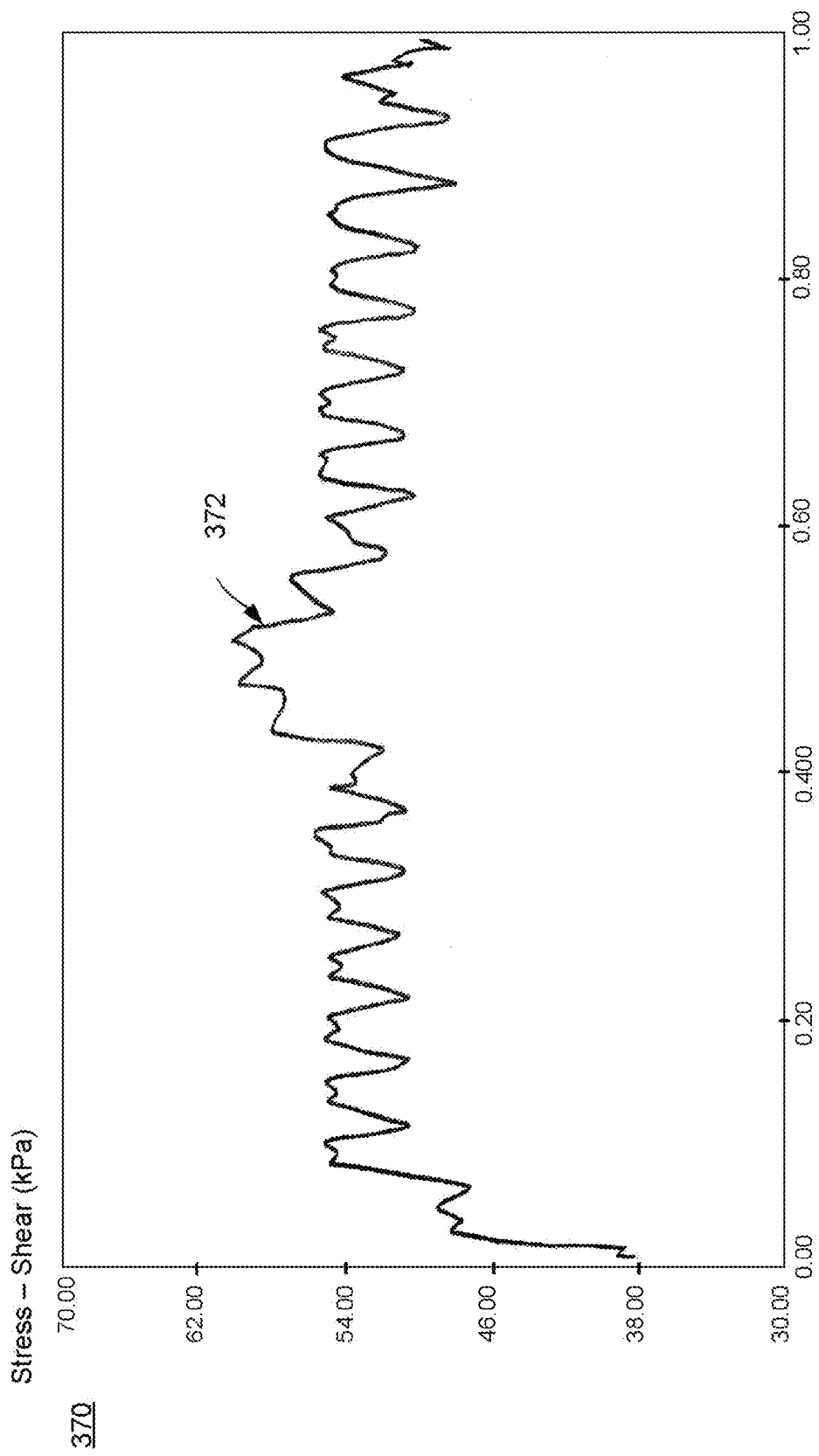
Figure 8A:
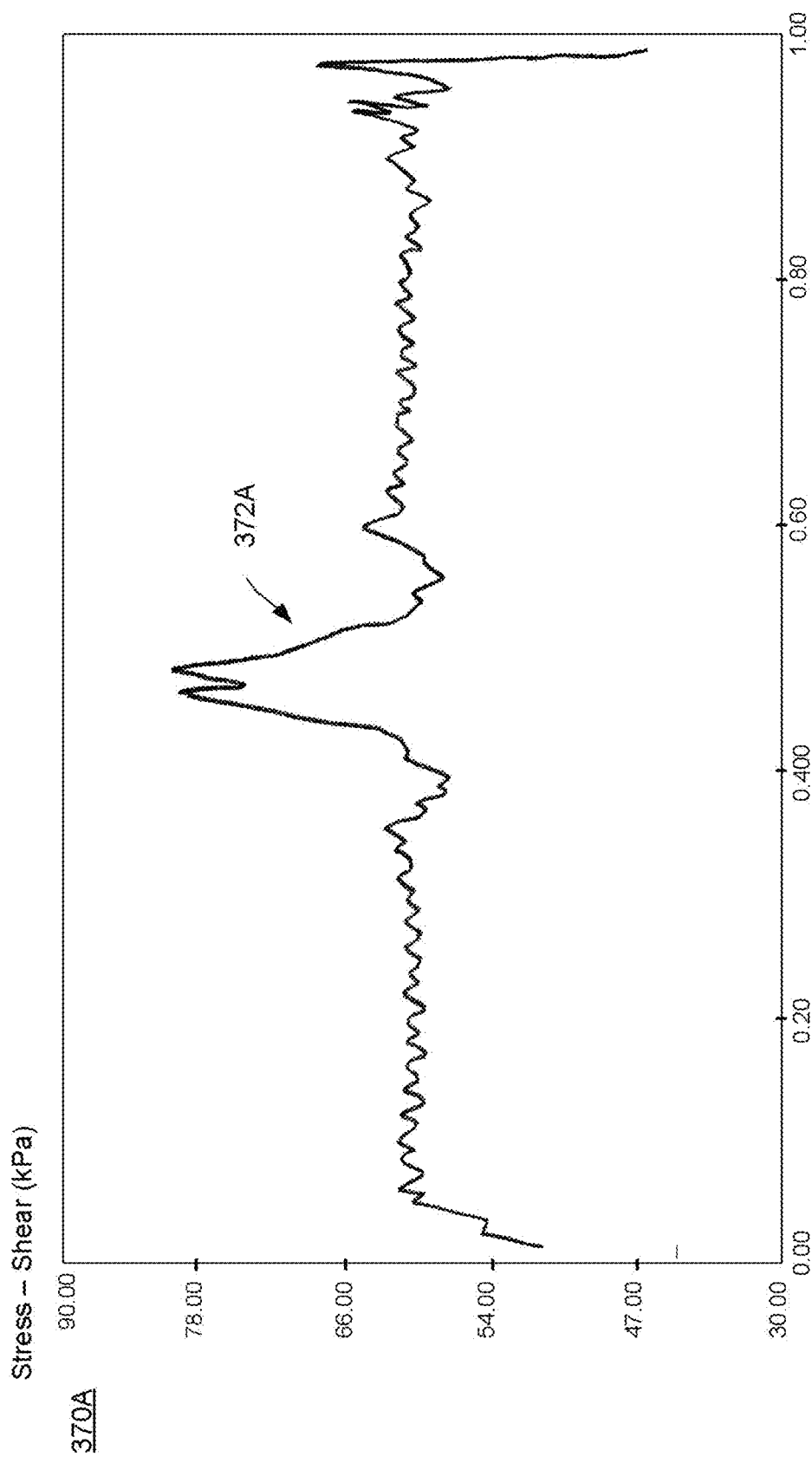
Figure 8B:
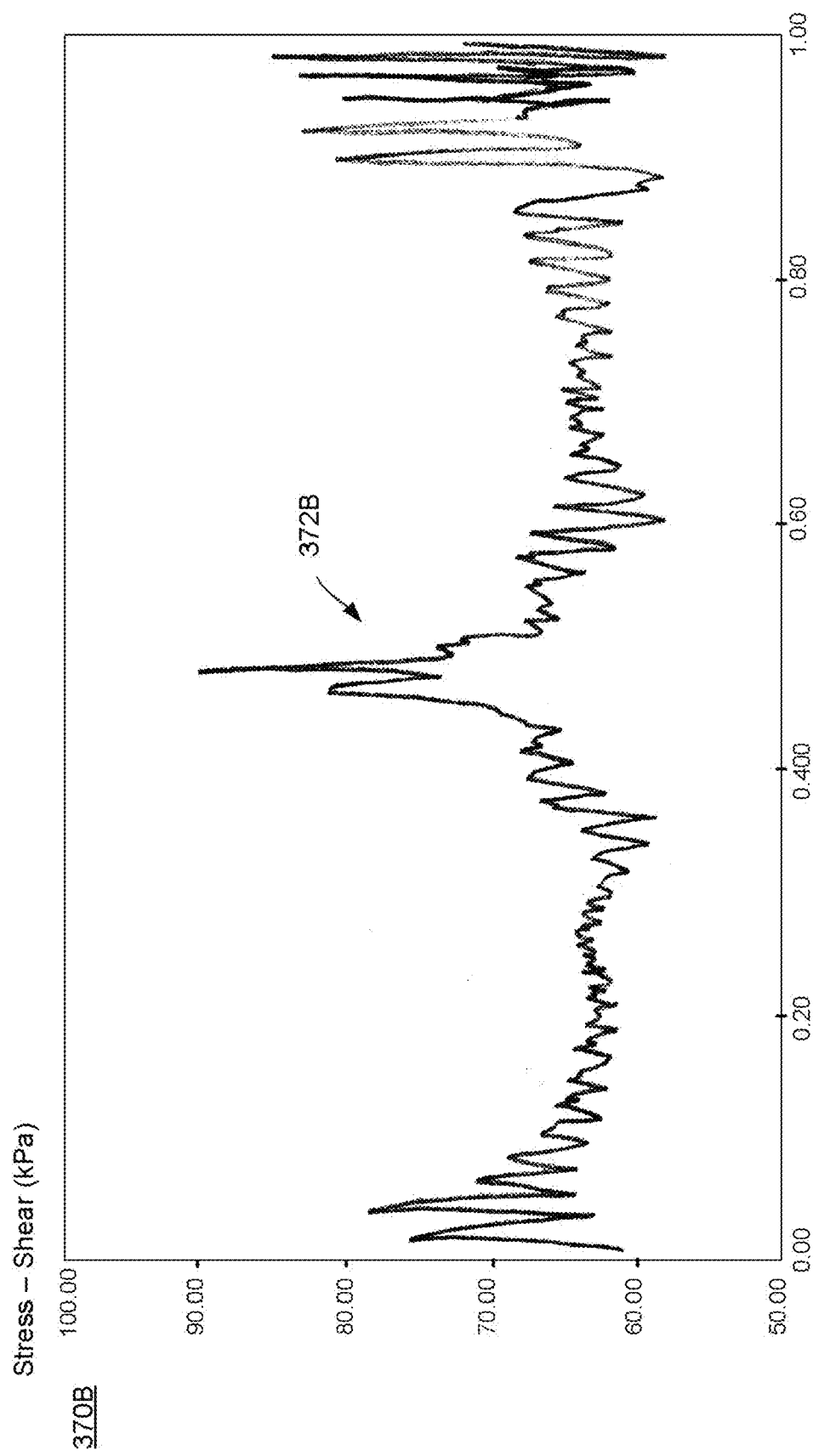
Figure 9:
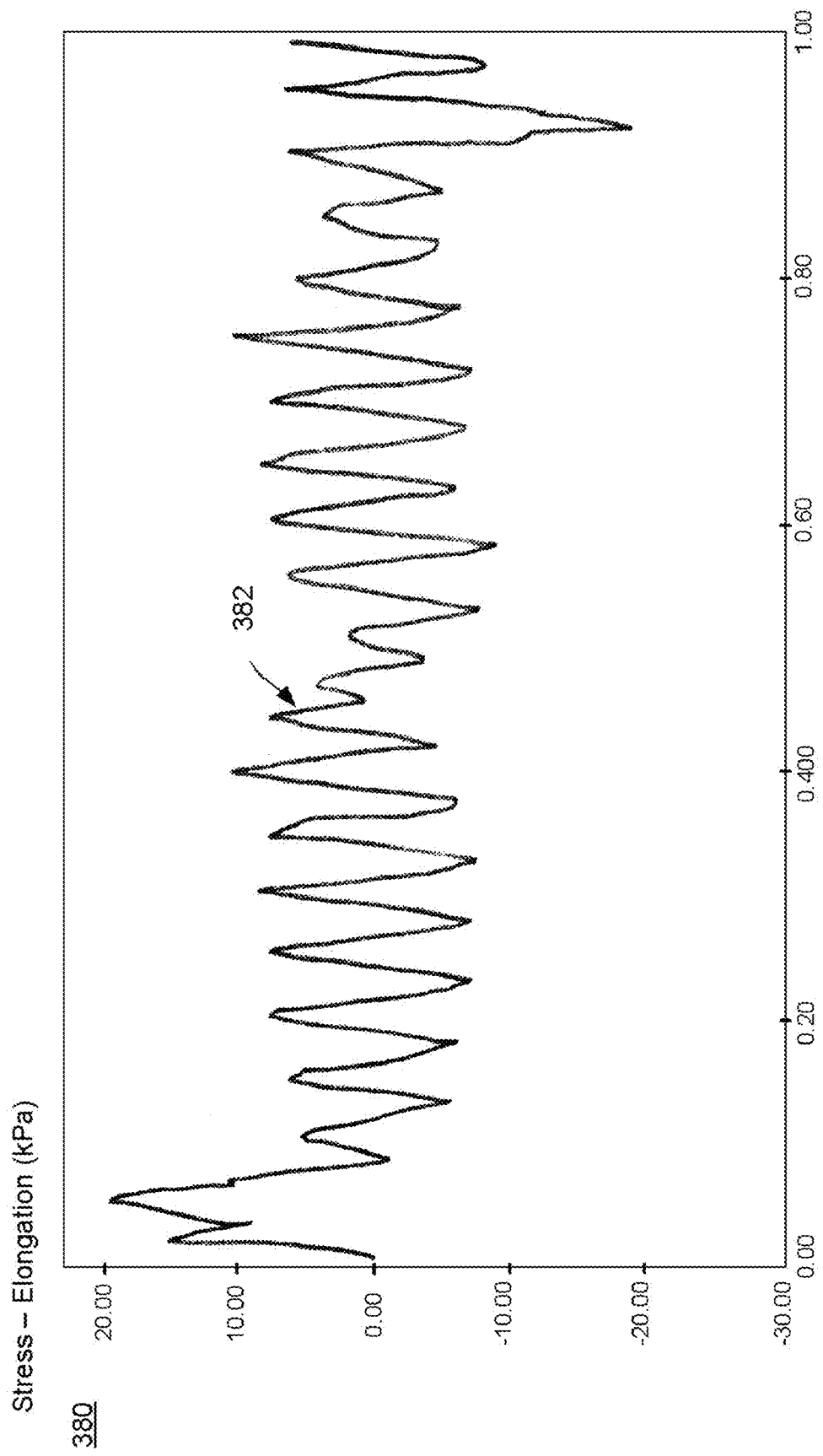
Figure 9B:
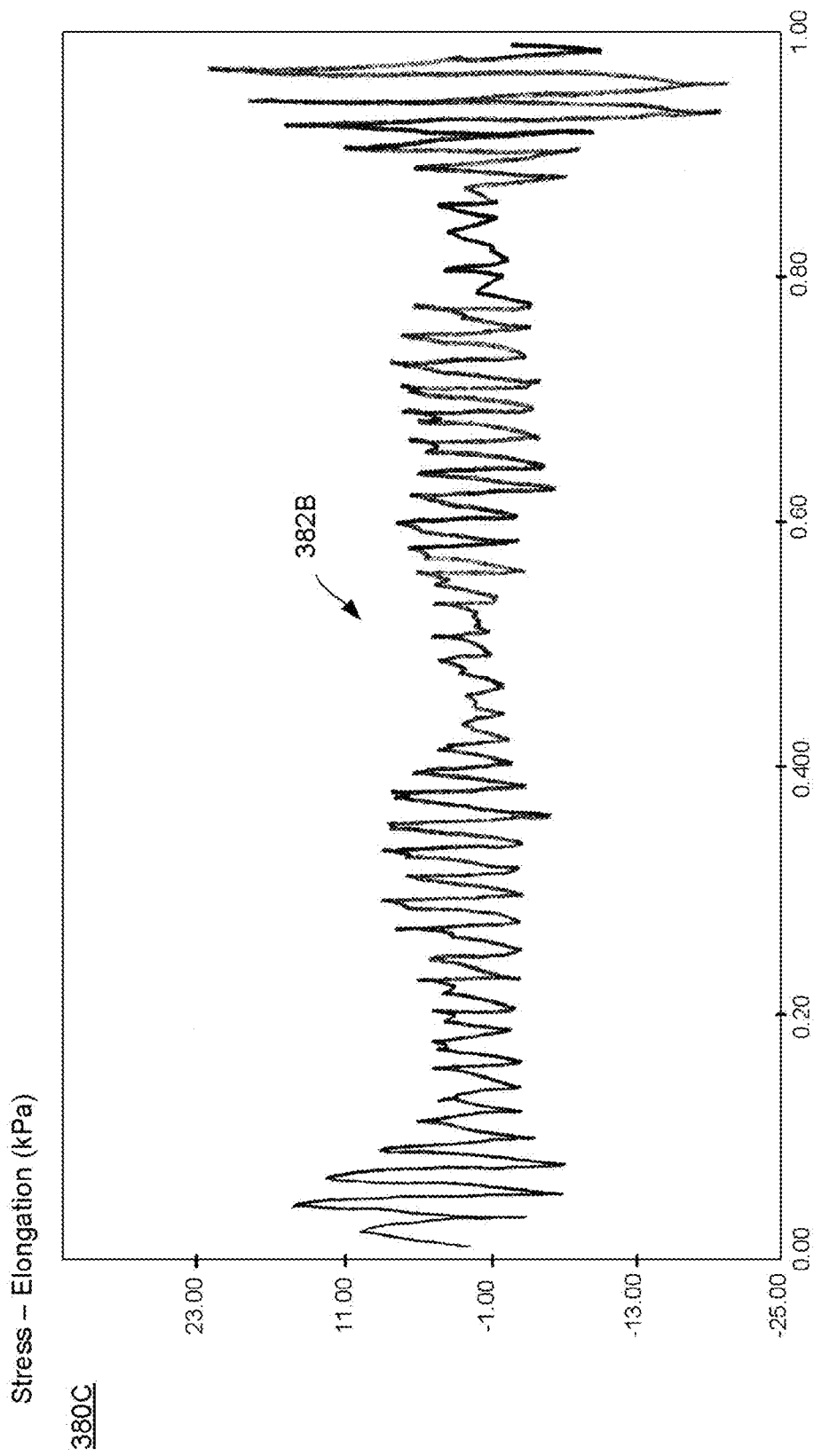

FIGS. 8, 8A, and 8B illustrate the effect of modulation in graphical form modelled with the Compuplast software in the manner described above. FIG. 8 shows modulations experienced by a particle of Lyondell Basell Profax 6323, a homopolymer PP with a MFI=12 placed on mixer having a 3,600 mm frustoconical rotor referred to herein as a model 50 mixer. Mixer temperature was set at 170° C. and rotor speed at 125 rpm which, experientially, produces a throughput of 50 lbs/hr. Line 372 shows shear stress (kPa) which, in steady-state, varies between about 50 and 55 kPa. Line 372A in FIG. 8A shows shear stress at the 100% longitudinal position and 50% gap position varies between about 58 and 62 kPa which is a narrower band at a higher stress level which is a reflection of shallower pockets. Line 372B in FIG. 8A shows shear stress at the 100% longitudinal position and 25% gap position varies between about 70 and 80 kPa. The variation in line 372B indicates that particles closer to the rotor experience more turbulence and movement than those closer to the barrel surface. FIGS. 9, 9A and 9B show corresponding elongation shear which fluctuates about 0 kPa as expected. The cylindrical space includes two cylinders separated by a wall, therefore the first cylinder width extends from 0.00 to 0.50 and the second extends from 0.50 to 1.00. Lines 372, 372A and 372B show that the modulations are substantially uniform in each cylinder except at the boundaries where the cycles are either larger (at the edges of the cylindrical space) or smaller (at the transition between the two cylinders). It is believed that the edge effects are partially a modelling construct while the transition effect is representative of the geometry of the wall relative to the pocket dimensions. Regardless, it is believed that the walls present a degree of shear and turbulence that improves mixing even more regardless of the shape of the wall. In other words, whether the wall is elliptical or normal to longitudinal axis of the rotor, it changes the gap positions of particles. The impact of the benefit may be larger with fewer modulations.

Extensive research has shown that synergistic results are obtained when the molten composition is sheared in the extensional flow, highly repetitive, mixer at a rate between 200 $sec^{-1}$ and 1000 $sec^{-1}$ in a shear field with a resulting stress of between 20,000 and 100,000 Pa and is exposed to a minimum of 100 events at a temperature approximately equal to or lower than the melt temperature of the molten composition measured at the feed port. Preferably, the molten composition is sheared at a rate of between 300 $sec^{-1}$ and 600 $sec^{-1}$ in a shear field with a resulting stress of between 40,000 and 80,000 Pa. Even more preferably, the molten composition is sheared at a rate of between 250 sec$^{-1}$ and 665 sec$^{-1}$ in a shear field with a resulting stress of between 50,000 and 70,000 Pa while the highly repetitive mixer cools the extruded molten polymer at least 5° C. Cooling of 10° C. and more may be desirable when the rate is between 400 sec$^{-1}$ and 600 sec$^{-1}$. Gap distances greater than 0.5 mm, and preferably about or more than 1 mm, result in backpressure of less than 1,000 psi, and preferably between 200 and 400 psi. Backpressure increases with increasing polymer velocity. When polymer is exposed to the appropriate shear field as described herein, the molecular weight of the polymer will change less changes encountered in higher shear intensity mixer methods, ultimately resulting in reduced molecular damage (commonly referred to as degradation).

Mixer 102 is suitable for mixing a broad range of polymer, inorganic materials and chemically reactive materials. Exemplary polymers include thermoplastic polymers such as PA, PC, PP, PE, HDPE, PMMA, PS, ABS and PVC. Inorganic materials include montmorillonite nanoclays, calcium silicates such as Wollastonite, magnesium silicates such as Talc, Calcium carbonate such as chalk or limestone, titanium dioxide, color pigments, carbon nanotubes, glass fibers and carbon fibers. Organic materials include liquid, powder or pelletized pigments, dies, stabilizers, processing aids, lubricants, fragrances, and biologically active materials. The resultant compounds are particularly suitable for the manufacture of thermoplastic molded parts, barrier sheets, blown containers and films. In one embodiment, the polymer composition comprises Nylon 6 intercalated with organoplate nanoparticles. In other embodiments, the composition comprises minerals, pigments, and fibers.

Nanoclays are nanoparticles with structures like a book with thousands of thin platelets held together packet structures. Extensional flow mixing cycles exfoliate inner platelets after outer platelets are removed. A polymer composition comprising about between 0.1 to 50.0% by weight may be exfoliated and mixed by the method and apparatus of the invention.

In addition to the exfoliation benefits already described, extensional flow mixing according to the method described above enables production of compounds at lower additive concentrations to achieve the desired result. For example, more homogenous color is achievable using less color concentrate. Surface conductivity may be achieved with carbon nanotube concentrations at least 30% lower than what is needed to achieve the same value in conventional mixing systems (without the extensional flow mixing disclosed herein).

As described in more detail below, the molten composition relaxes after it is no longer exposed to forces produced by the pockets. Relaxation may occur quickly. While the two-stage mixer described further below increases the time available before the polymer composite fully relaxes, it is desirable in many cases to move the polymer composite out of mixer 102 before it relaxes. Depending on the amount of mixing desired, the discharge port may be moved closer to the feed port. The molten composition may be provided from the discharge port to an extrusion die, for example a flat die such as a coathanger profiled die, so that the polymer composite is transformed into a sheet or film without fully relaxing. In this manner, the polymer may relax as it is being extruded and in this manner relaxation does not negatively affect the throughput of mixer 102.

In another embodiment of a mixing method, a molten composition is mixed in a two-stage mixer. A molten composition is provided to the first-stage of a two-stage mixer constructed according to teachings disclosed herein where it is conditioned as it flows through a high stress region of sufficient stress amount and duration, with residence time in the first stage mixer under 5 seconds and shear stresses exceeding 600 sec$^{-1}$, moving to the second stage, extensional flow, mixer described above. Residence time in the extensional flow mixer sized as described above may be between 10-40 seconds. The conditioned molten composition is transferred and mixed again in the second stage of a two-stage mixer, e.g. mixer 102, as described above.

Figure 10:
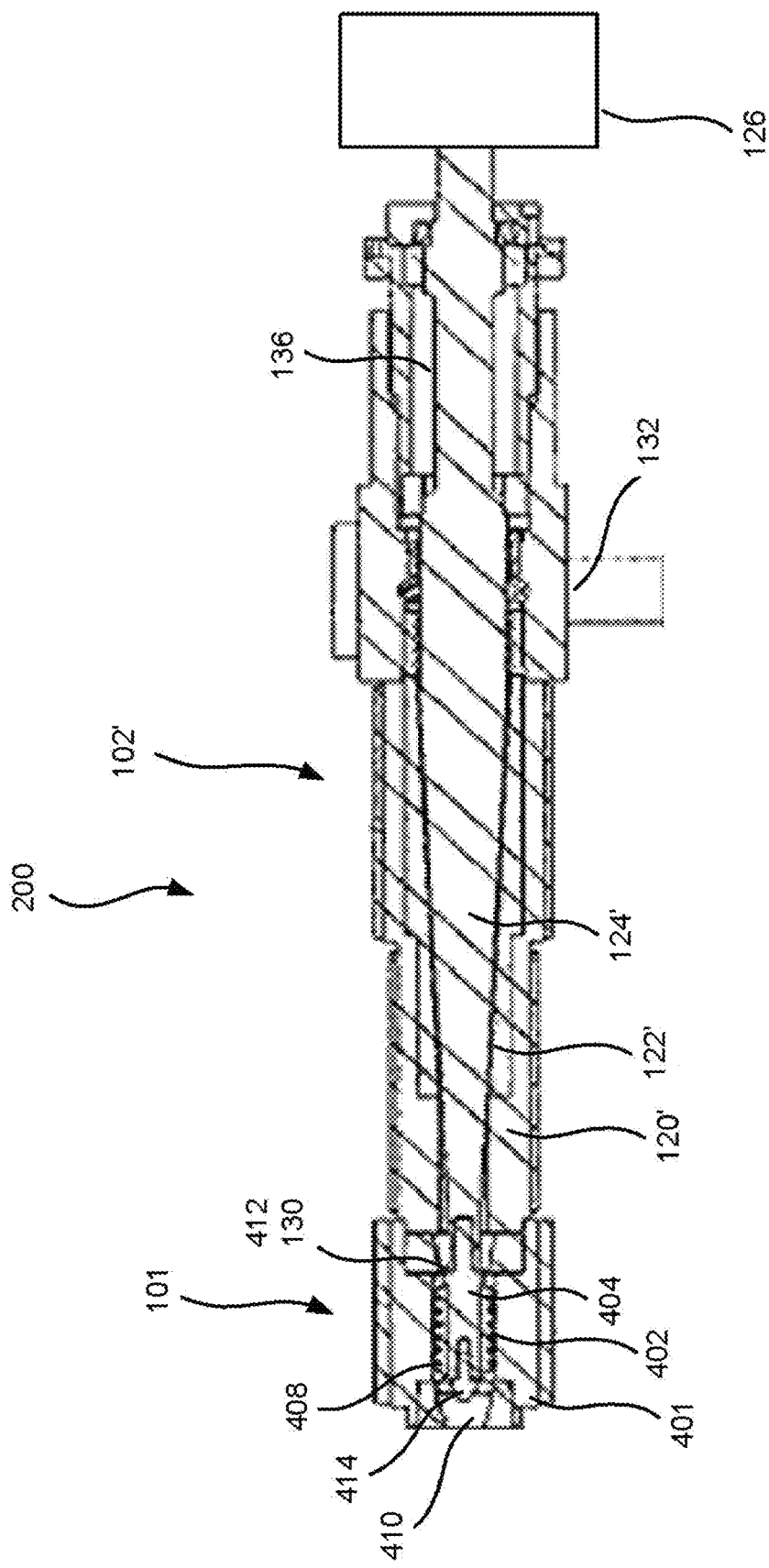
FIG. 10 is a cross-section view of a two-stage mixer.

FIG. 10 is a plan view of two-stage mixer 200. Mixer 101 conditions the molten composition as described in more detail below. The conditioning step increases the mixing efficiency of mixer 102' as compared to mixer 102' used as a single-stage mixer. Further, depending on the design of mixers 101 and 102', additional exfoliation and improved mixing may be achieved by the addition of mixer 101, particularly when significant reductions in particle size are desirable. In the embodiment shown, mixer 101 and mixer 102' are modular in design. The components of each mixer may be removably coupled to enable swapping of entire stages or may be adapted to swap only specific mixer components. Two-stage mixer 200 may receive a molten composition from any source. Exemplary sources of molten compositions include single screw extruders and twin-screw extruders.

Mixer 101 comprises casing 401 having a cylindrical bore 402 therethrough, a first stage rotor 408 rotatably supported within bore 402. First stage rotor 408 as shown comprises a shearing portion and a shaft 408 although in alternative embodiments rotor 408 is of single-piece construction. Casing 401 comprises a feed port 410 and discharge port 412 which are in fluid communication with bore 402. A securing element 414, illustratively a threaded nut, may be provided to secure rotor 408 onto shaft 404. FIG. 10 also shows first stage mixer 102' having a frustoconical stage 1 rotor exemplified by rotor 124' supported within casing 120' and forming gap 122' therewith. Melt pressure across two-stage mixer 200 may be controlled by controlling the output of extruder 1 by the speed of screw 4 or by the output of feeder 10 in relation to the rotation speed of rotors of mixers 101, 102' and the rotation speed the gear pump (not shown) or orifice diameter (not shown) at discharge port 132. Pressure is controlled automatically in one embodiment of the invention with a control loop that monitors pressure in the mixer. In another embodiment pressure is controlled by the configuration of the exit die. Melt temperature may be controlled by a temperature control system (not shown) comprising a temperature controller and heating means such as band heaters or jacketed barrel with a heated heat transfer fluid and cooling means having fluid pipes therein adapted to circulate heat transfer fluids including oil, water, air or water and air. External air cooling may also be provided.

Fluid materials develop a mixing history which determines their structural composition and behavior in subsequent processing steps. Mixing history refers to the amount of elongational, or extensional, and shear stress to which the material has been exposed, and the duration of that exposure. Mixing elements are categorized as distributive and dispersive mixing elements. In dispersive mixing, passage of material through a region of high stress produces desirable breakdown of particle sizes and agglomerates. To achieve a fine scale of dispersion, multiple passes may be necessary. Passage through high shear regions results in shear thinning of the molten composition which includes a reduction in apparent viscosity of up to 300% or more. Although high shear regions are beneficial to reduce viscosity by shear thinning, allowing free particle movement within the host matrix, it has been found that excess use of high shear events create high stresses within the polymer matrix leading to excess degradation of the host polymer or of the additives therein.

First stage mixing element 101 incorporates a number of design features adapted to expose substantially the entire molten composition to at least one high stress cycle. In one embodiment, barrier flights are provided to create high shear stress regions. The barrier flights are designed to force all the molten composition to pass through the high shear stress zones. In another embodiment, the first stage mixing element provides elongational stress.

Figure 11:
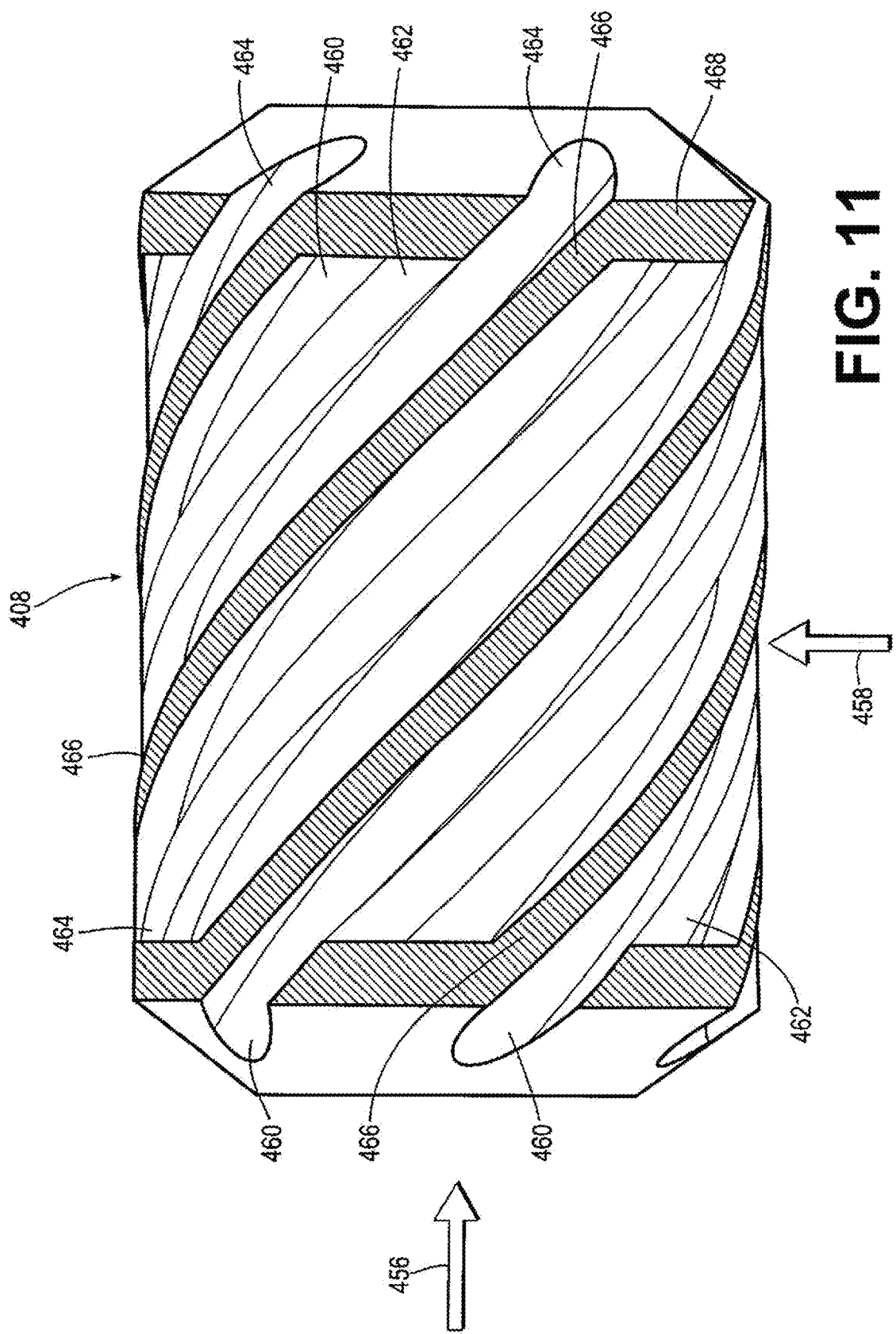
FIG. 11 is a plan view of a first stage mixing rotor.

FIG. 11 is a plan view of first stage rotor 408 exemplified by a helical shear mixer (HSM) comprising a plurality of channels and helical flights. First stage rotor 408 comprises inlet channels 460, outlet channels 464, barrier flights 462 disposed between channels 460 and 464, and sealing flights 466 disposed between channels 464 and 460. Sealing flights 466 have blind ends 468 disposed at each end. Arrow 458 indicates the direction of rotation of first stage rotor 408. Sealing flights 466 are darkened for ease of understanding.

Helical flights 462, 466 are disposed at a positive helix angle configured to push the molten composition from feed port 410 to discharge port 412. Preferably, the helix angle is between 30 and 70 degrees. More preferably, the helix angle is between 40 and 60 degrees. Even more preferably, the helix angle is between 45 and 55 degrees.

Figure 12:
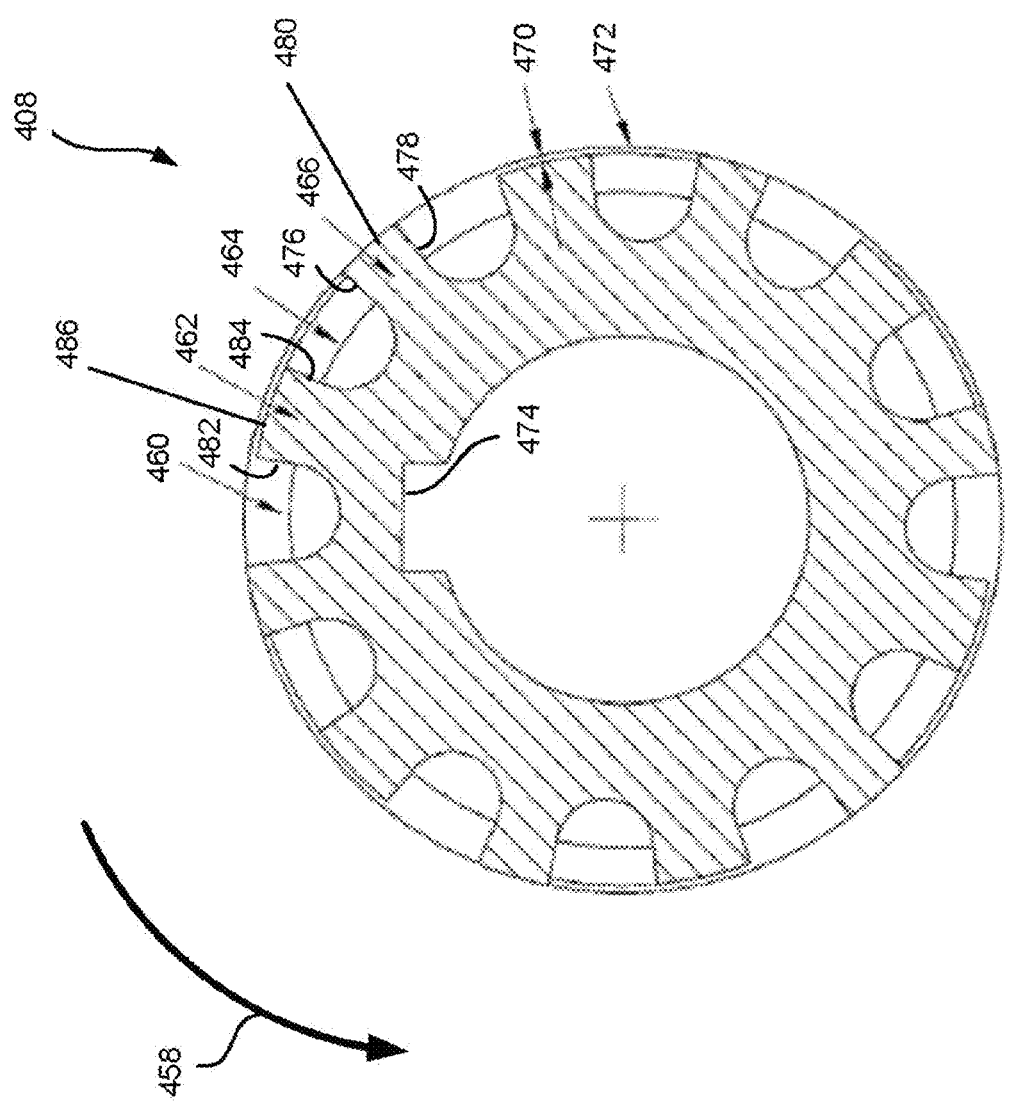
FIG. 12 is a cross-sectional view of the first stage mixing rotor of FIG. 11.

FIG. 12 is a cross-sectional view of first stage rotor 408 showing internal surface 472 of bore 402. Sealing flights 466 protrude circumferentially and comprise leading surface 476, trailing surface 478, and top surface 480 intersecting surfaces 476 and 478. A narrow seal gap is provided (too narrow to be visible) between top surface 480 and internal surface 472. The seal gap is configured to prevent the molten composition from crossing over from outlet channel 464 to inlet channel 460, thereby forcing the molten composition to flow forward. Barrier flights 462 protrude circumferentially and comprise leading surface 482, trailing surface 484, and top surface 486 intersecting surfaces 482 and 484. A shear gap 470 is provided between top surface 486 and internal surface 472. Shear gap 470 is configured to cause the molten composition to pass from channel 460 to channel 464 over top surface 486 and in so doing to experience high shear stresses adapted to break-up agglomerates and particles. Arrow 258 indicates the direction of rotation of first stage rotor 408 as being counter-clockwise. High shear rotor 408 further comprises slot 474 adapted to secure it to shaft 404.

First stage rotor 408 provides both distributive and dispersive mixing. Distributive mixing is achieved through flow splitting and recombining. Dispersive mixing is achieved from the creation of shear stress. Material enters first stage rotor 408 through inlet channels 460. Channels 460 and 464 may have a semi-circular or rectangular cross-section. Channels 460 taper down to blind ends causing all the material to pass over a barrier flight 462 to a channel 464 before discharging. Material is forced through first stage rotor 408 by pressure created by extruder 1 and by the pumping action of flights 462 and 466. Top surfaces 480 and 486 are either flat or contoured parallel to inner surface 472. In one embodiment, shear gap 270 is, preferably, between 0.001 and 0.150 inches, more preferably between 0.005 and 0.075 inches, and even more preferably between 0.010 and 0.050 inches. The gap can be changed as required for particular applications, e.g., particle sizes and material agglomerations, with smaller gaps providing higher dispersive shear strain forces. After flowing over flight 462, material flows into channel 464 which may also be tapered. Material exits channels 466 and recombines completing the distributive mixing function of the mixer. The pumping function performed by flights 462 and 466 favorably reduces the melt pressure drop across mixer 101. In one embodiment, substantially all the molten composition passes over a flight 462 before exiting mixer 101.

Figure 14:
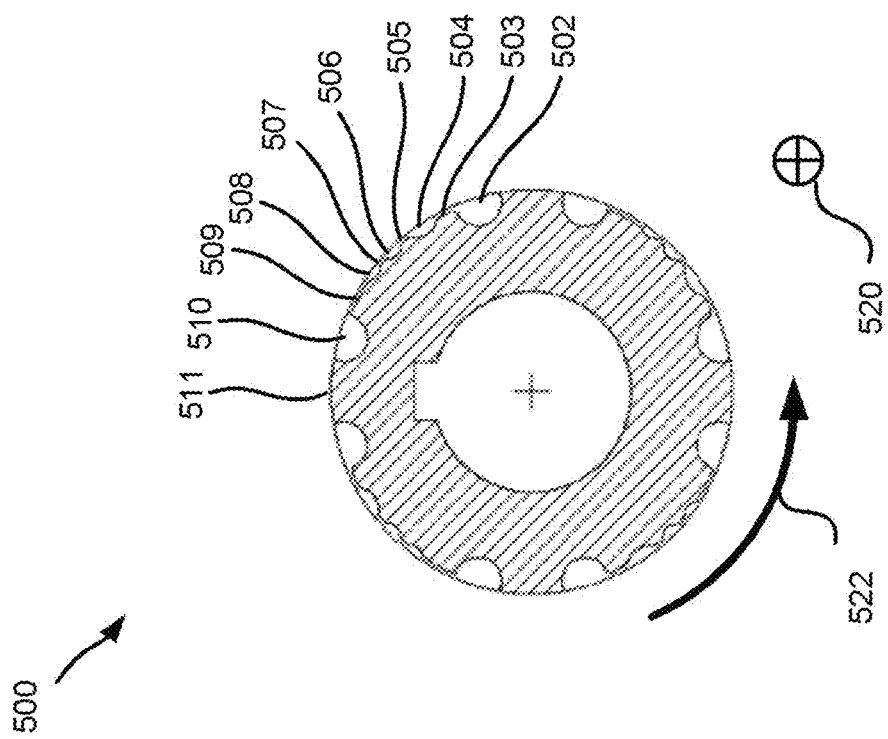
FIGS. 13 and 14 are plan and cross-sectional views of another first stage mixing rotor.
Figure 13:
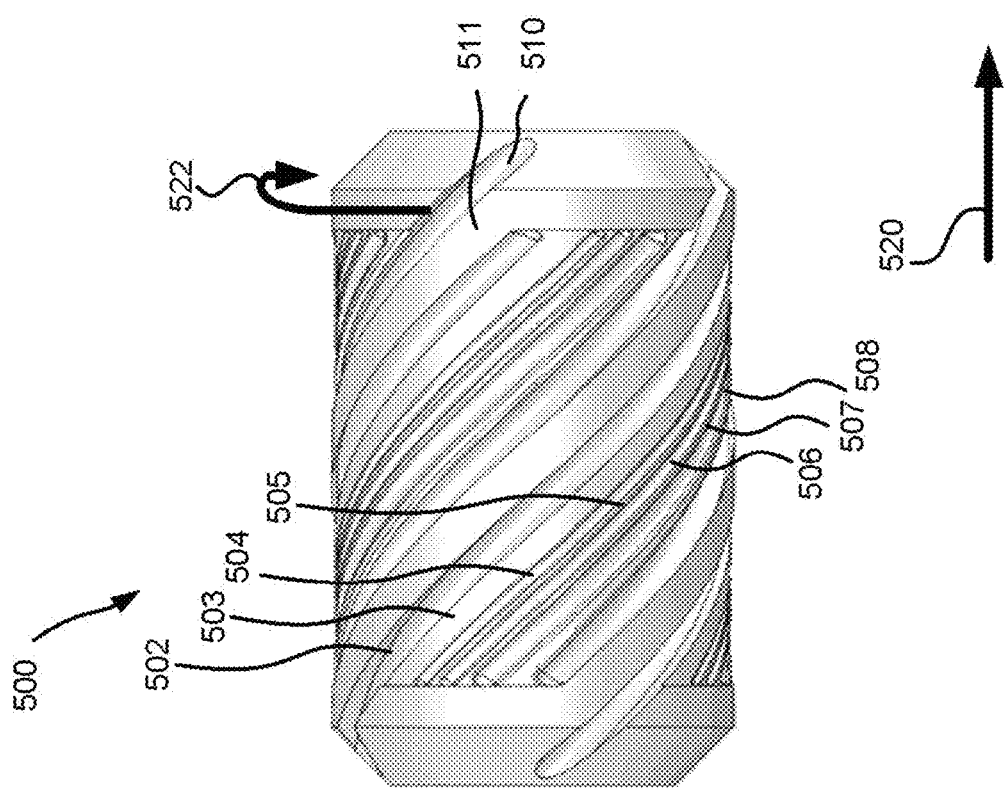

FIGS. 13 and 14 are plan and cross-sectional views of another embodiment of a first stage mixing element. First stage mixing element 500 comprises inlet channels 502, outlet channels 510, barrier flights 503, 505, 507 and 509, and quiescent channels 504, 506, and 508 disposed between channels 502 and 510, and sealing flights 511 disposed between channels 510 and 502. Sealing flights 511 have blind ends disposed at each end. Arrow 520 indicates the direction of flow of the molten composition. Arrow 522 indicates the direction of rotation of first stage mixing element 500. In one embodiment, each of barrier flights 503, 503, 505, 507 and 509 create different size gaps with corresponding different degrees of shear. In one embodiment, the barrier flight gap distances progressively decrease to provide progressively aggressive shear regions. In one embodiment, the cross-sectional area of channels 502, 504, 506, and 508 decreases progressively with channels disposed closer to the outlet channels 510 having the smallest cross-sectional area. Between 2 and 6 progressive shear barrier flights may be provided to increase the dispersive mixing capacity of a first stage mixing element.

In another embodiment, each of barrier flights 503, 505, 507 and 509 are shaped with a radiused protrusion on top which forms a narrowing flow area on their leading edge side resulting in repetitive extensional flow stresses. In one embodiment, the barrier flight gap distances progressively decrease to provide progressively aggressive elongational stress regions.

FIG. 15 is a plan view of another embodiment of a first stage mixing element. Mixing element 600 is a progressive helical shear (PHSM) mixer. In the embodiment shown, mixing element 600 comprises a plurality of discs that may be assembled in various combinations to tailor mixing rotor 600 to various types of materials. Arrow 620 indicates the direction of flow of the molten composition. Arrow 622 indicates the direction of rotation of first stage mixing element 600. All channels 608, 609 and 610 have blind ends at least one end of each channel. Channels 609 taper down to blind ends at both ends. Channels 608, 609 and 610 have curved cross-sectional area. Preferably, the helix angle is between 30 and 70 degrees. More preferably, the helix angle is between 40 and 60 degrees. Even more preferably, the helix angle is between 45 and 55 degrees. Multiple channels 608 divide the material as is enters mixing element 600. Material is forced overflights 612 by pressure flow and by their pumping action. The tops of flights 612 are parallel to the surface of bore 402. In one embodiment, mixing element 600 comprises a single component. In one embodiment, the gap between flights 612 and the surface of bore 402 decreases resulting in progressively higher shear stress as the molten composition moves through the first stage mixer.

In one embodiment, the first stage mixing element is formed in one-piece with the shaft. In another embodiment, the first stage mixing element is detachably coupled to the shaft. In a further embodiment, the first stage mixing element is coupled to the distal end of an extruder screw and designed to fit within the extruder barrel such that the end of the first stage mixing element is proximal to the feed port of a highly repetitive mixing element.

A two-stage mixer according to the embodiments hereinabove described may be utilized to supply novel combinations of composite polymers and temperatures. In one embodiment, a two-stage mixer is coupled to a film or sheeting extrusion die including, for example, flat, T-shape, coathanger and blown film dies. In another embodiment, the two-stage mixer is coupled to an injection molding machine for producing injection molded parts.

Single and two-stage screw-plunger machines are well known. In a two-stage injection molding machine, an extruder melts polymer and feeds molten polymer into an injection chamber through an admission valve. The amount of injected material is referred to as a "shot." The admission valve allows polymer to flow from the extruder to the injection chamber and prevents polymer from flowing back out of the injection chamber. An injection plunger then pushes a shot from the injection chamber into the mold.

In one embodiment, an injection molding machine is modified to receive a treated molten composition. A treated molten composition is a molten composition discharged from a mixer, either a single or two-stage mixer. In a two-stage screw-plunger injection molding machine, a treated molten composition is fed to the injection chamber through the admission valve. The treated composite may be the sole source of material fed to the injection chamber or may be one source in addition to material provided by the injection molding extruder.

Figure 16:
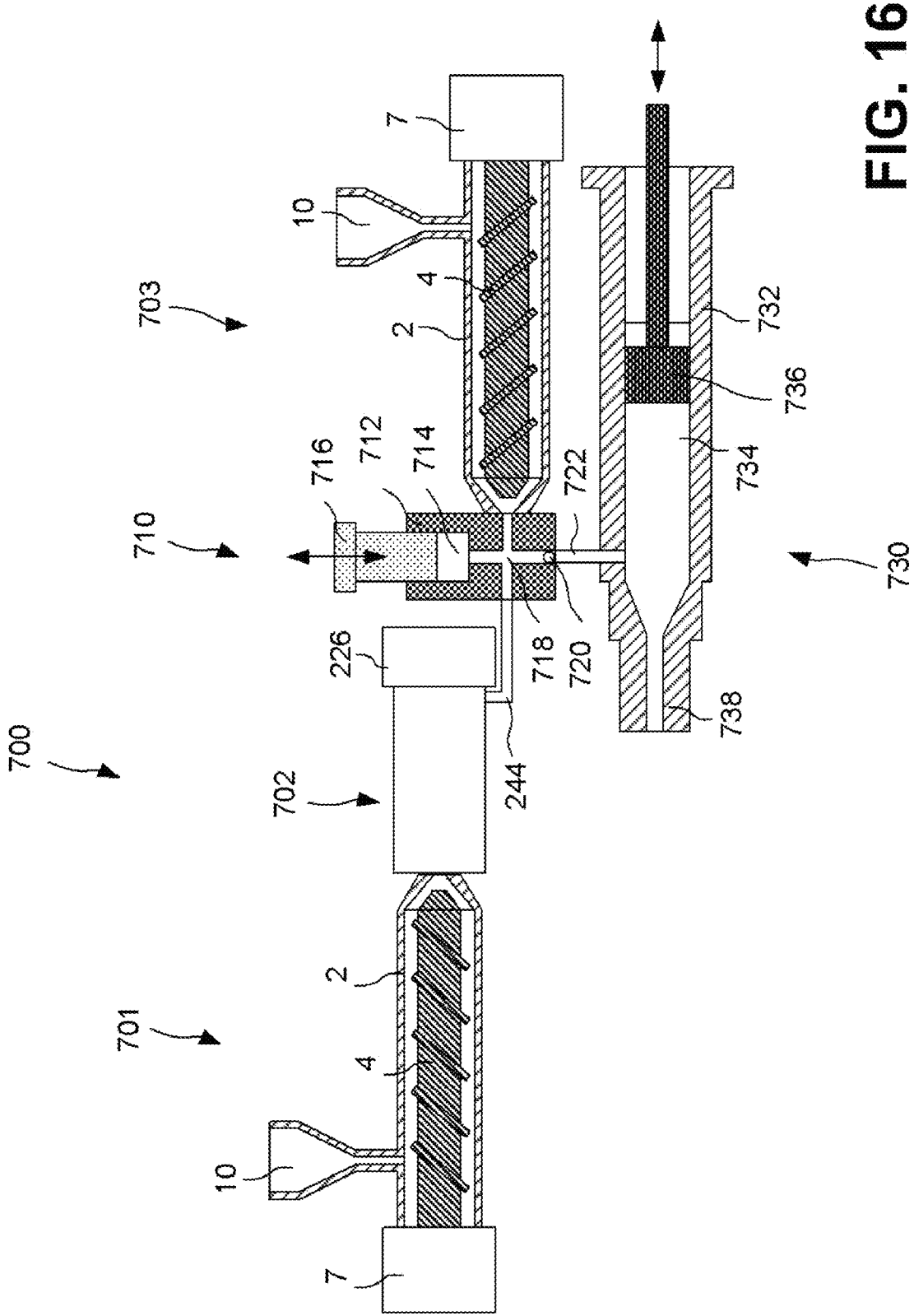
FIG. 16 is a schematic plan view of an injection molding system.

FIG. 16 is a plan view of injection molding system 700. Injection molding system 700 includes an extruder 701, a mixing device 702, a shot pot device 710, and an injection molding unit 730. Alternatively, injection molding system 700 may also include a second extruder 703. Mixing device 702, and, alternatively, second extruder 703 deliver molten compositions to shot pot device 710 which delivers the combined molten composition to injection molding unit 730. Extruders 701 and 703 comprise barrel 2, screw 4, and feeder 10. Barrel 2 comprises a bore adapted to receive screw 4 and create a gap therewith. Material delivered to feeder 10 enters barrel 4. Rotating means 7 causes screw 4 to rotate. As it rotates, each screw 4 melts and mixes the composition and causes it to flow out of extruders 701 and 703, respectively. The output flowing out of extruder 701 enters mixing device 702 where it is further mixed. Mixing device 702 includes a mixer comprising a highly repetitive mixing element such, for example, mixer 102 or two-stage mixer 200. Driver 126 rotates the highly repetitive mixing element. A molten composition exits mixing device 702 through discharge pipe 244. Additional details of mixing device 702 were provided above with reference to FIGS. 1-10.

Shot pot device 710 comprises a body 712 having a bore, or elongate hole, 714 slidably coupled to a plunger 716. Plunger 716 slides within bore 714 a stroke distance with defines, together with the diameter of the elongate hole, the size of a molten polymer shot. Discharge from mixing device 702 and, alternatively, extruder 703, enters and moves through shot pot device 710 through melt channel 718 formed on body 712. On one end of melt channel 718 is disposed an admission valve 720 for preventing molten-polymer back-flow. When admission valve 720 is closed, the pressurized molten polymer(s) push plunger 716 in an outwardly direction to increase the space available in bore 714. A biasing force may be applied against plunger 716 (not shown) to control molten polymer pressure. Polymer composite is pushed by plunger 716 out of melt channel 718 through melt pipe 722 and into injection molding unit 730.

Injection molding unit 730 comprises a body 732 having a bore which forms an injection cavity 734. The bore is slidably coupled to an injection plunger 736 for pushing molten polymer through a nozzle 738 and into a mold (not shown) through a sprue bushing. Injection plunger 736 builds up packing and holding pressure. Admission valve 720 is opened when injection plunger 736 retracts to enable injection plunger 716 to push one shot of polymer into injection cavity 734. A control system operates injection molding unit 730 in a manner that is well known in the art.

The relaxation time of a polymer melt is the time required for the applied strain force to decrease e-times (about 2.7 times) compared to an original strain value applied to the melt. Generally, the relaxation time ($\lambda$) of molten compositions range between 0.01-0.90 seconds. Relaxation times vary according to melt temperature and viscosity. Given a time of transient deformation, or time of external force influence, which is a time between machinery applied stresses (t), and relaxation time ($\lambda$), a Deborah Number De=$\lambda$/t can be found that defines the reaction of polymer melt molecules to external deformation. De reflects the rate at which elastic energy is either stored or released by a molecule during a process. At low Deborah numbers, materials behave as liquids. At De>1 polymers store elastic energy, and at De<1 polymers release elastic energy. Table 1 shows relaxation times for various polymers.

TABLE 1

| Polymer | Time (Seconds) |
|---|---|
| HDPE with fractual melt (MFI < 1 g/10 min), at 190° C. | 1.000 |
| Polyprolylene (MFI = 12) at 130° C. | 0.053 |
| Nylon 6 (Bergamid 70) at 235° C. | 0.010 |
| Nylon 6 (Bergamid 70) with 8% nanoclay at 235° C. | 0.900 |
| PMMA (Plexiglas V920) at 170° C. | 0.500 |

A multitude of low shear rate shear stresses impact the molten composition as it passes through a highly repetitive mixing element. A velocity gradient splits the material into stream lines as portions of the material contact the pockets and other portions pass over the pockets. The portion of material contacting the pockets contacts the leading, trailing, and top surfaces of pocket walls, and the pocket bottom surfaces. Each of the four surfaces provides a different type of shear action. Depending on the length of the mixing element, the gap, and the variations in pocket depths, extensional flow may be created. In some embodiments, the flow may be compressive if the upstream annular cross-section (calculated from the pocket bottoms) is larger than the downstream cross-section which would reduce the velocity through the mixing element to achieve feed/discharge material balance. In the mixing field, De goes from De<1 to De>1 gradually. The stress field intensity changes with frequencies similar to polymer melt relaxation time. For example, one cycle of stresses applied to a material stream passing a channel at 150 rpm lasts for 0.09-0.82 sec over the length of the mixer.

The following power law formulas provide a theoretical basis for understanding the surprising mixing results:

$$\tau = K \dot{\gamma}^n \quad (1)$$

$$\eta_a = K \dot{\gamma}^{(n-1)} \quad (2)$$

where (1) denotes that

Shear stress=Consistency Index×Shear rate$^{Power\ Law\ Index}$ and (2) denotes that Apparent viscosity=Consistency Index×Shear rate$_{(Power\ Law-1)}$ For Newtonian liquids, n=1 and K is the same as the viscosity. However, polymer melts are pseudoplastic so n<1. The second stage maintains the molten composition in an elastic state at extremely low temperatures to increase viscosity. A portion of the molten composition flows in the channel and another portion flows in the pockets. However, due to the repetitive nature of the design, there is constant separation, re-combination and cross-over of flow.

Table 2 shows typical melt temperatures measured at the discharge port of an extruder compared to the melt temperature measured at the discharge port of the second stage. The second stage temperatures are lower by about 40° C. to 135° C.

TABLE 2

|  | Extruder Discharge Temperature ° C. | Second Stage Discharge Temperature ° C. |
| --- | --- | --- |
| PC | 280 to 200 | 215 |
| PA6 | 260 to 290 | 225 |
| ABS | 180 to 140 | 150 |
| HDPE | 200 to 280 | 145 |
| PP | 200 to 300 | 165 |
| PS | 180 to 260 | 150 |
| LDPE | 160 to 140 | 120 |
| TPE (polyolefin elastomer) | 150 to 120 | 80 |

Experiments were conducted on system 200 to generate the following examples. Unless noted otherwise, the molten compositions comprised polymers with 4-12 MFI. The extensional flow mixer (stage 2 mixer) was set-up with gaps ranging from 0.5 to 1.5 mm, typically about 1 mm. The mixer rotor rotated at about 100-125 rpm and at a rate of 25-30 lbs/hr. Constant pressure of about 300 psi was maintained in the second stage by regulating the speed of the extruder. Melt pumps and other apparatus and methods may be used to control pressure. Reducing the gap materially below 0.5 mm increased heat and temperature but did not change the number of events and therefore did not produce material changes in performance.

EXAMPLE 1

Improved Mixing with Two-Stage Mixer

Improved mixing results were demonstrated in the production of a red composition. A molten composition comprising 25% red colorant and 75% LDPE was mixed in system 200 and subsequently let-down in a conventional 1 inch single-screw extruder (without any additional shear mixer used in the single-screw extruder) capable of feeding about 30 lbs of composite material per hour. Air cooling was provided to maintain the second-stage mixing portion at a temperature at least 20° C. below the temperature at which the molten composition exited the extruder. Due to the starvation-feeding pressure control technique, the overall throughput of the test machine was slightly less than the nominal rate of the extruder or about 20 lbs per hour.

Samples of the material after letdown were prepared in a Carver press. Approximately 10 mg of sample was placed between two microscope slides. The sandwich of slides and specimen was placed between the heated platens of the Carver laboratory press. The temperature of the platens is set to 25° C. above the melting point of the virgin carrier resin, determined by DSC. After 3 minutes, the sample is pressed at 1 metric ton of applied force for 3 minutes. The hydraulic pressure is released and the sample is removed and allowed to cool to room temperature.

By virgin carrier resin or virgin resin it is mean resin which has not been processed through a two-stage mixer. A virgin resin may comprise a plurality of polymers, either dry mixed prior to extrusion or combined during extrusion. Virgin resin may also comprise recycled polymer in ground and/or pelletized form.

Particle sizes were measurement with a microscope. A circle with an 8 mm diameter was drawn with permanent marker on the top slide located in the center of the sample specimen. The slide was placed on the stage of a laboratory microscope equipped with a movable stage, bottom light source, and digital camera objective. The microscope was set at 100 power total magnification. A minimum of 10 digital images were captured and saved from random areas of the sample. Care was taken to obtain images from the entire area within the previously marked circle. Digital image processing software, such as Motic Images Plus 2.0, was used to measure the diameter of the most visible particles from each image. The particle size measurements were averaged to determine the mixing quality of each sample. Average particle sizes measured by the method described above were reduced on average from 49.5 to 17.6 microns—a 280% improvement.

EXAMPLE 2

Reduced Degradation (Mw Loss)

A homopolymer 4 MFI resin was treated in the two-stage mixer described above to cause it to perform similarly to a MFI=20 resin for use in fiber production. The resin was extruded in 25.4 mm, 28:1 L/D single-screw extruder at a rate of 7 kg/hr. Extruder melt temperatures ranged between 235 and 140° C. A 2.78 mm diameter die was used. As the comparative data below indicates, mixing reduced backpressures between 8-13% and reduced Mw loss as well.

|  | MFI = 4 | MFI = 20 |
| --- | --- | --- |
| Extruder Only |  |  |
| MW Loss | 4.6% | 4.1% |
| Backpressure | 930 psi | 606 psi |
| Extruder + Mixer |  |  |
| MW Loss | 4.6% | 2.4% |
| Backpressure | 858 psi | 528 psi |

The resins tested included (1) Pinnacle Homopolymer Polypropylene PP –1120H, MFI=20, Density 0.900, and (2) Lyondell-Basell Homopolymer Polyproylene Profax-HP6523, MFI=4, Density=0.900. No additives were used (no antioxidants or any other process modifiers). The mixer normally runs a backpressure below 300 psi (21 bar) so a single orifice die was used to increase backpressure to more closely replicate a fiber extrusion operation.

The two resins were extruded through a single orifice die, with and without extensional flow mixing. The mixer temperature was 190° C. Pressure and temperature probes were mounted on the die, with the same die always used. For extruder-only tests, the die was connected directly to the standard extruder and the MFI=20 and MFI=4 resin were run. The desired melt temperature was 235° C. to 239° C. measured at the die discharge port for all samples. This was selected because that was the lowest temperature that could be obtained on a MFI=4 resin with this die. Even with the extensional flow mixer attached, although the mixer temperature could be reduced, the shear action at the die raised the actual melt temperature with the MFI=4 resin. Throughput was held constant at 7 kg/hr. At the desired operating condition of 130° C., the viscosity of the MFI=4 resin is dramatically higher than the MFI=20 resin. At higher shear rates, with shear-thinning, the viscosities converge. At lower temperatures, such as 190° C., the viscosity almost doubles at low shear rates, with the MFI=4 resin approaching 2040 pa-sec viscosity at zero shear, versus at 130° C. approaching 1900 Pa-sec.

The base case, without the two-stage mixer, includes three experiments:

|  | Sample No. | | |
| --- | --- | --- | --- |
|  | 2F | 2G | 3J |
| MFI | 4 | 4 | 20 |
| Mixer rotor speed, RPM | 150 | 50 | 50 |
| Extruder temperatures, ° C. | 190 | 265 | 140 |
|  | 130 | 280 | 280 |
|  | 130 | 280 | 280 |
| Mixer discharge temperature, ° C. | 233.2 | 254.4 | 239.8 |
| Die Pressure, psi | 930 | 814 | 606 |
| Die swell, mm | 3.96 | 3.75 | 3.65 |
| Mw Loss from virgin, % | 4.6 | 10.8 | 4.1 |
| MFI tested on pellet, g/10 min | 5.2 | 7.8 | 23.1 |

Running a 4 MFI resin as a 20 MFI resin creates significant degradation. Sample 3J was the base case for MFI=20 resin, showing an extruder melt temperature setting of 140/280/280 was required to maintain a melt temperature of approximately 140° C. Sample 2F was a base case sample for a MFI=4 resin, showing that lower melt temperatures of 190/130/130 were required to maintain the desired final temperature range. The backpressure was higher at 930 psi and degradation was similar to the MFI=20 resin, that is 4.6%. Sample 2G was also MFI=4 resin, but attempting to maintain similar extruder temperature settings as were used with the MFI=20 resin. The MFI=4 resin due to its higher viscosity produced a final melt temperature of 254.4° C. and had Mw 10.8% degradation. We therefore saw that the MFI=4 resin must be run with lower extruder temperatures if final melt temperature is to be held constant.

The two-stage mixer test includes four experiments. Extruder temperatures were set at 190/130/130° C. in all cases. Results of tests conducted with two-stage mixer are shown below in Table 3. Samples A and 1E were run at the same conditions except for rotor speed and show the same Mw degradation. Sample A shows a reduction in backpressure of 8% versus sample 1E. Sample 2E shows the 20 MFI resin running at an extremely low temperature in the mixer achieving lower Mw degradation compared to test 3G (without the mixer). Samples C and 2E were run at the same conditions except for rotor speed. Backpressure and degradation are very low.

TABLE 3

|  | Sample No. | | | |
| --- | --- | --- | --- | --- |
|  | A | 1E | 2E | C |
| MFI | 4 | 4 | 20 | 20 |
| Mixer rotor speed, RPM | 150 | 50 | 50 | 100 |
| Mixer discharge temperature, ° C. | 234.7 | 235.8 | 167 | 142 |

TABLE 3-continued

|  | Sample No. | | | |
| --- | --- | --- | --- | --- |
|  | A | 1E | 2E | C |
| Die Pressure, psi | 858 | 2270 | 698 | 528 |
| Die swell, mm | 3.91 | 5.88 | 4.37 | 4.04 |
| Mw Loss from virgin, % | 4.6 | 3.0 | 3.0 | 2.4 |
| MFI tested on pellet, g/10 min | 5.2 | 4.5 | 22.1 | 21.9 |

EXAMPLE 3

PEO Mixing

A series of tests were performed on several compositions containing PEO. First, the tests were performed on a 1" single screw extruder, 24:1 L/D, with a general purpose screw, to assess extrudability. The materials were extrudable, but the molten polymer composite discharged by the extruder was a poorly mixed paste.

The compositions were then extruded and treated with a mixer to provide a homogeneous composite with high PEO loadings (50% to 90%) while avoiding surging that is typical with PEO loadings above 20%. In some tests, a twin-screw extruder was used instead of a single screw extruder. In the single screw extruder, PEO was added together with base resin at the inlet of the extruder. In the twin-screw extruder a separate inlet was provided in zone 10 (of 12) for addition of PEO. Base resin was added at the extruder hopper in zone 1. Results are shown in Table 4.

TABLE 4

| | | Processing | | | Treater | | |
| --- | --- | --- | --- | --- | --- | --- | --- |
| Base Resin | Extrusion Style | Rate lbs/hr | Percent PEO addition | Melt Temp. (Extruder Exit) | Temp. | Die Temp Set point | Rotor RPM |
| Engage 8401, TPE | Single Screw | 17.7 | 50% | 82 | 75 | 75 | 80 |
|  | Twin Screw | 9 | 70% | 82 | 75 | 85 | 80 |
|  |  | 25 | 60% | 110 | 80 | 95 | 50 |
|  |  | 25 | 70% | 110 | 80 | 95 | 50 |
|  |  | 25 | 80% | 110 | 80 | 95 | 50 |
|  |  | 25 | 85% | 110 | 80 | 95 | 50 |
| Total PS-525, PS | Single Screw | 8.8 | 50% | 190 | 160 | 150 | 80 |
|  | Twin Screw | 25 | 70% | 190 | 160 | 150 | 50 |
|  |  | 25 | 80% | 190 | 160 | 150 | 50 |
|  |  | 25 | 90% | 160 | 150 | 150 | 50 |
| Sunoco TR 3350 CD, PP | Single Screw | 8.8 | 50% | 120 | 100 | 150 | 80 |
|  | Twin Screw | 25 | 70% | 190 | 140 | 130 | 75 |
|  |  | 25 | 80% | 190 | 130 | 130 | 75 |

The mixer temperature set-point was similar to the actual temperature at the discharge port. Extruder and mixer exit melt temperatures for the three resins were:

| TPE | 82° C. | 80° C. |
| --- | --- | --- |
| PP | 190° C. | 150° C. |
| PS | 120° C. | 150° C. |

Samples were tested for percent weight loss after soaking in both boiling and ambient water. Results are shown in Table 5. The ambient test was the most relevant, because the Polyox is in the most reactive state to leach. The Engage 8401 showed dramatically higher PEO exudation than the other samples. Weight loss tests, hot and ambient, were performed. To test weight loss, the samples were dried at 85° C. for 1 hour under vacuum conditions to flash off any water (and this could flash off any volatile extractions also).

TABLE 5

| Base Resin | Extrusion Style | Rate lbs/hr | PEO addition % | Weight loss % Hot, 15 min @ 100° C. | Ambient, 12 hours |
|---|---|---|---|---|---|
| Engage 8401, TPE | Single Screw | 17.7 | 50% | 7.11 | 62.72 |
|  |  | 9 | 70% | 3.94 | 21.75 |
|  | Twin Screw | 25 | 60% | 4.43 | 30.79 |
|  |  | 25 | 70% | 6.53 | 57.89 |
|  |  | 25 | 80% | 13.63 | 71.78 |
|  |  | 25 | 85% | 34.51 | 96.95 |
| Total PS-525, PS | Single Screw | 8.8 | 50% | 6.68 | 32.87 |
|  | Twin Screw | 25 | 70% | 8.18 | 51.16 |
|  |  | 25 | 80% | 14.88 | 52.79 |
|  |  | 25 | 90% | 10.55 | 58.9 |
| Sunoco TR 3350 CD, PP | Single Screw | 8.8 | 50% | 6.71 | 33.02 |
|  | Twin Screw | 25 | 70% | 4.08 | 42.79 |
|  |  | 25 | 80% | 9.62 | 66.02 |

EXAMPLE 4

Nanotube Concentration V. Surface Conductivity

Carbon nanotubes are extraordinarily expensive so reduced concentration solutions which retain critical physical properties are desirable. Since polymeric films are inherently insulative, they can become charged and behave like capacitors. Discharge can happen in a single event causing considerable damage to surrounding materials such as electronic components. To prevent electrostatic discharge, a surface resistivity of approximately $10^5$-$10^6$ is generally acceptable.

Basell Hostalen GD9555 HDPE and Baytubes C150P carbon nanotubes, obtained from Bayer Material Science, were mixed to produce film and plate samples having nanotube concentrations of 10%, 7%, 5%, 4%, and 3% by weight. The HDPE resin had a MFI=0.90 g/10 min, measured at 190° C. and 2.16 kg load/in according to ISO 1133. The compositions were dry-blended and extruded with a Werner Pfleider ZSK 30 twin-screw extruder having a 30 mm diameter, 40:1 L/D, and standard barrels and kneading blocks. The melted composition was discharged from the twin-screw extruder at a rate of 16 lbs/hr and fed directly into an extensional flow mixer. Extruder temperatures (° C.) for the five extruder zones were 149, 200, 200, 200, 200 while the mixer was set at 170° C. Polymer samples were collected simultaneously from an exit port in the adapter pipe and from a mixer discharge port to compare the twin-screw composition to the composition from the twin-screw after further processing in the model 50 mixer.

Test samples were produced from the composition samples with a Carver compression press at 120° C. and 500 psi. A Monroe Electronics Model 291 meter was used to measure film surface resistivity according to ASTM D257. Three samples were averaged to produce each result. A Barnstead Thermolyne 1300 furnace was used to produce ash samples to measure the nanotube concentration. Samples were produced under nitrogen at a constant flow of 200 cm³/min. Nanotube concentration in the polymer composite was tested gravimetrically after 1 hour heating at 500° C. Three samples were averaged to produce each result. Mechanical properties were measured with an Instron 3345 Universal Material Testing Machine. Five samples measurements were averaged to produce each result. Tensile properties were tested according to ASTM D-638 using specimen type IV.

As illustrated in Table 6, test results show that tensile modulus increases proportionally with concentration until a threshold at about 7% for extensional flow processed samples. This percolation bar is very close to the threshold of conductivity and suggests fundamental changes in the HDPE—nanotube composite's structure in this range of nanotube concentrations. At magnification=100000:1, SEM images show separation of nanotubes from their tide bundles. The percolation threshold was reached using lower concentrations of nanotubes than done conventionally, creating improved electrical and mechanical properties. Conductivity results showed the twin-screw product required a 7% nanotube concentration to achieve a surface resistance of 20,000 to 60,000 Ω per square required for this application. On the other hand, the extensional mixer product achieved comparable resistance with less than 4% nanotube concentration. The tensile modulus increased substantially with the extensional flow mixed product, versus the twin-screw extruder product, and reached a 218% increase over the original value, at a 10% concentration of nanotubes in HDPE. These data verify a strong dependence of the composites' structure on level and quality of nanotubes distribution in material.

TABLE 6

| | Twin screw + Extensional mixer produced samples | | Twin screw only produced samples | |
|---|---|---|---|---|
| Sample Number | Surface Resistivity, Ohms/sq | Tensile Modulus, GPa | Surface Resistivity, Ohms/sq | Tensile Modulus, GPa |
| 3% | 46,000 | 1.21 | $10^{11}$ | 0.97 |
| 4% | 26,000 | 1.27 | $10^{11}$ | 1.05 |
| 5% | 8,800 | 1.33 | 1,150,000 | 1.12 |
| 7% | 1,200 | 1.55 | 23,800 | — |
| 10% | 220 | 1.73 | 3,200 | 1.31 |
| Virgin HDPE* | >$10^{12}$ | 0.87 | >$10^{12}$ | 0.87 |

EXAMPLE 5

Nanotube Concentration V. Surface Conductivity

Another series of tests were performed mixing carbon nanotubes and HDPE to increase electrical conductivity of a product produced with two-stage mixer 200 at low nanotube loadings. All tests materials were extruded first on an ZSK-30 twin screw extruder at constant 500 rpm, starve fed to provide 7.2 kg/hr throughput, creating a very high shear process. Melt temperature in the twin screw was 200° C. Various levels of carbon nanotubes were added at the extruder hopper, along with Basell HDPE, tested in concentrations of 3% to 10%. No other chemicals or additives were added. The two-stage mixer was connected to the twin screw directly, and a single 8.7 mm diameter strand was made which was then pelletized. Mixer backpressure was under 100 psi. Pelletized pellets were pressing into a compression molded sheet and painted with electrical conductive paint at 1 inch spacings. Resistance was measured with a high calibration ohm-meter. Tests were repeated carefully, collecting multiple data entries.

Figure 17:
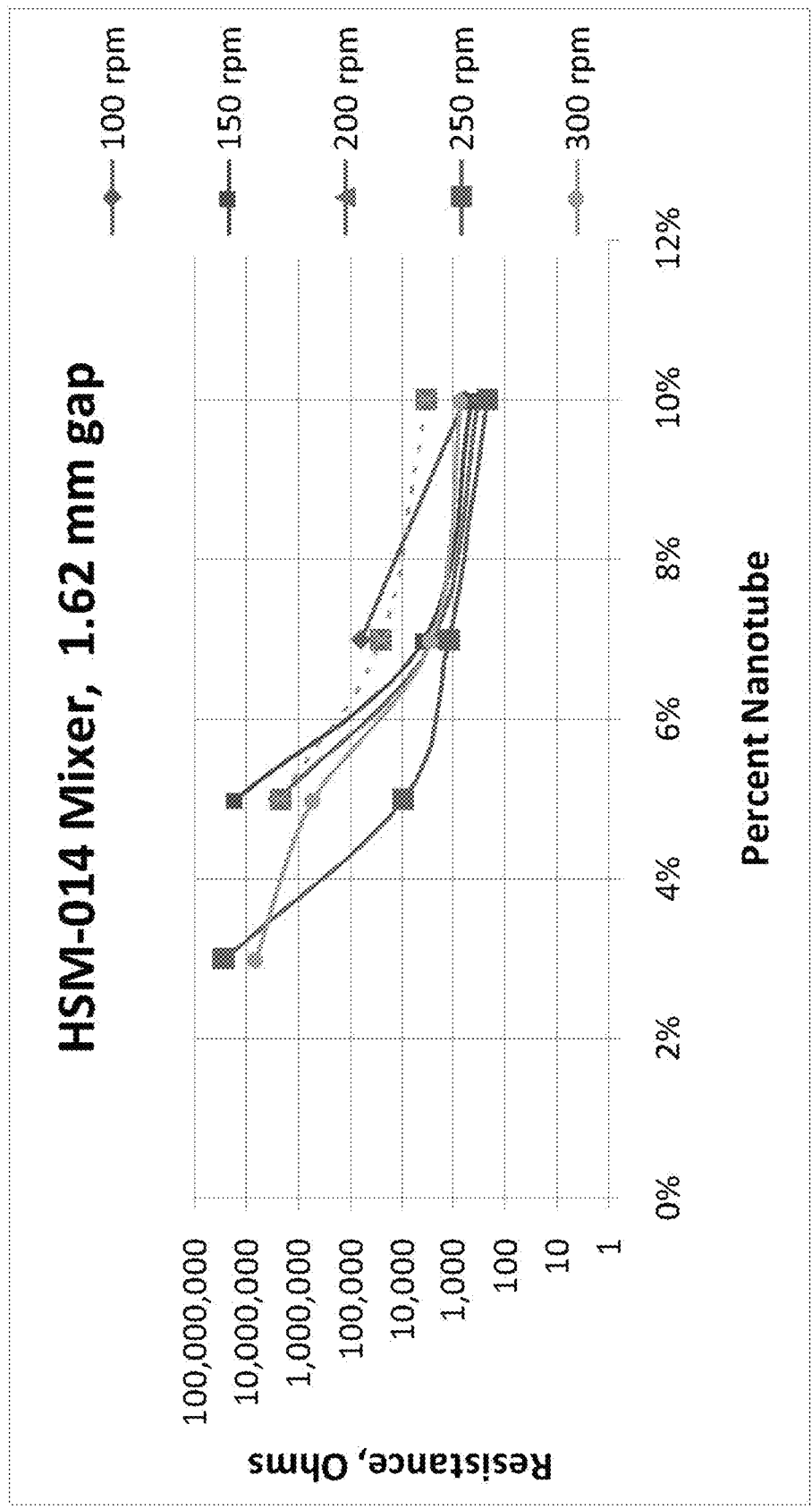
FIGS. 17-19 are graphs comparing resistivity to nanotube concentrations.
Figure 18:
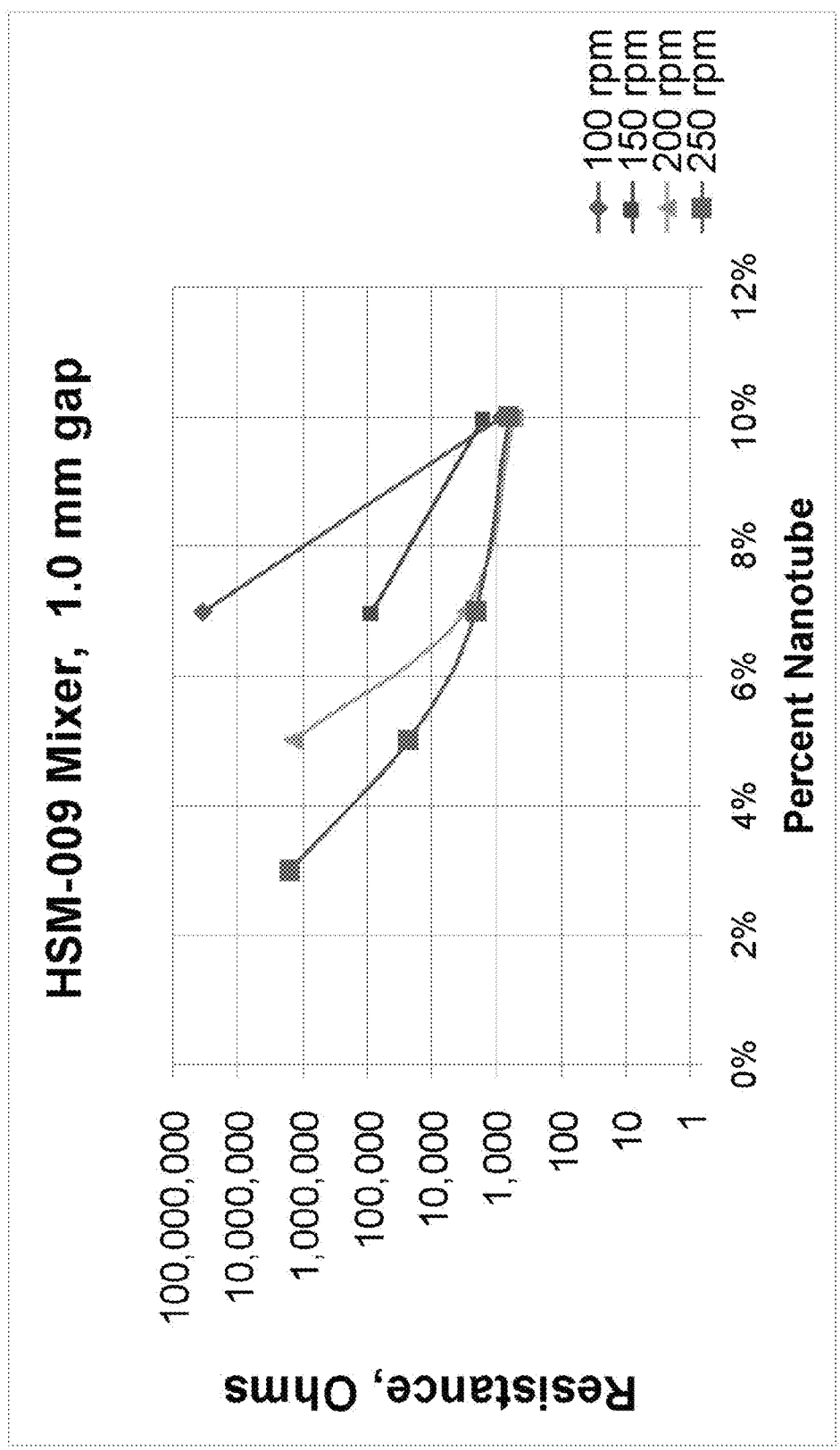
Figure 19:
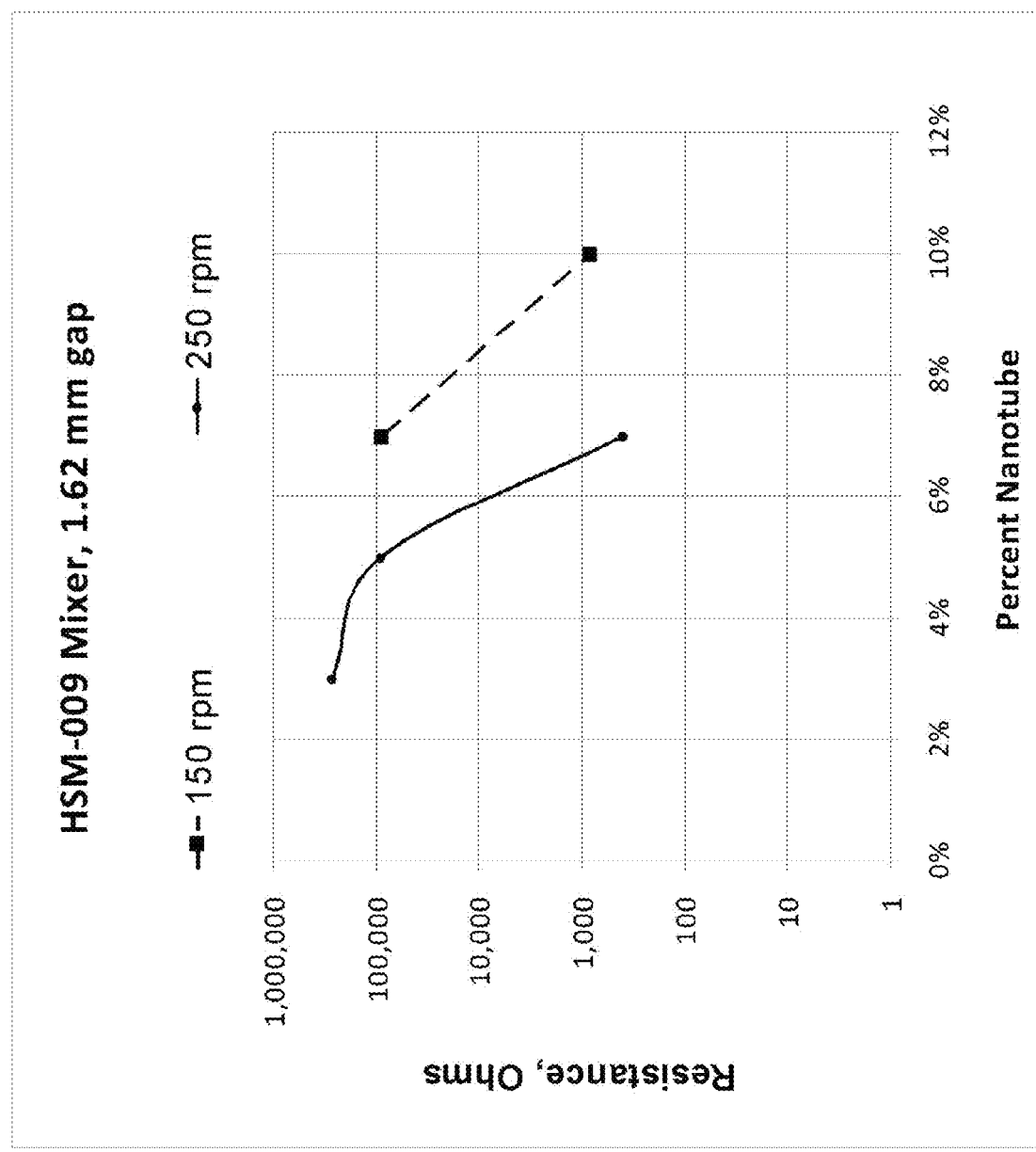

HSM009, HSM014, PHSM030 and HSM014 first-stage mixers were compared. HSM mixers were described with reference to FIG. 11 and PHSM mixers were described with reference to FIG. 15. The three digit numbers after the HSM and PHSM labels refer to the gap, in thousands of an inch or mils, between the first stage mixing element and the bore. The results, shown in Table 7 below, indicate significant improvement in conductivity with lower nanotube concentrations. Additional results are shown in FIGS. 17-19 where resistivity is compared to nanotube concentration at different mixer speeds. FIG. 17 shows results for the HSM014 mixer with a 1.62 mm gap. FIG. 18 shows results for the HSM009 mixer with a 1.0 mm gap. FIG. 19 shows results for an HSM009 mixer with a 1.62 mm gap indicating that an additional reduction of 2% may be achieved by increasing rotor speed from 150 rpm to 250 rpm.

TABLE 7

| Loading, % | Resistivity, ohms | | Mixer set-up |
|---|---|---|---|
| | Twin Screw | Two-Stage Mixer | |
| 3 | infinite | 262,000 | 1 mm gap, HSM009 mixer, 250 rpm |
| 5 | 120,000 | 8,800 | 1.6 mm gap, HSM014 mixer, 250 rpm (250X improvement) |
| 7 | 23,000 | 829 | 1 mm gap, PHSM-030 mixer, 100 rpm (29X improvement) |
| 10 | 3,000 | 120 | 1.6 mm gap, HSM014 mixer, 250 rpm (15X improvement) |

EXAMPLE 6

Nanoclay Composites

Nanoclay composites were produced with a single-screw extruder and mixed in an extensional flow mixer without first producing a nanoclay masterbatch. The results obtained with the single screw extruder and extensional flow mixer were compared to those achieved with a twin-screw extruder. Results obtained with the extensional flow mixer equal or exceed those obtained from conventional twin-screw technology.

Compositions comprising PA-6 and Nanomer I30P nanoclay made by Nanocor Inc. containing approximately 70% Montmorillonite clay and 30% octadecylamine surface modifier nanoclay were produced with nanoclay concentrations ranging between 88% and 96% by weight. PA-6 has a density of 1.13 g/cm$^3$. The dry melt volume rate (275° C./5 kg) was 160 cm$^3$/10 min.

In the first test, the composition was extruded in a 1-inch (25 mm), 24:1 L/D Davis-Standard single-screw extruder equipped with a conventional conveying screw (without a shear mixing section) which was directly coupled to a 50 mm extensional flow mixer. In the second test, the composition was extruded in a co-rotating Werner Pfleider ZSK 30, 30 mm diameter, 38:1 L/D twin-screw extruder. After mixing, the polymer composites were pelletized.

The single-screw extruder was operated at a rotational speed of 120 RPM and 130° C. barrel temperature. The extensional flow mixer initially operated at a rotational speed of 125 RPM with a 185° C. barrel temperature, with melt exiting at 195° C. Subsequent tests increased the extensional flow mixer rotational speed to 100, 125, and 150 RPM. Throughput was 10 kg/hr.

The twin-screw extruder was operated at rotational speed 250 RPM, and had barrel zone temperatures 130° C., 260° C., 120° C., 130° C. and 130° C. Set-up was according to Nanocor Specification sheet *Lit. N-608 (10/04) Guidelines & Setup Parameters For Nylon 6 Nanocomposites*. http://www.nanocor.com/tech_sheets/N608.pdf.

Compositions were tested with a Bohlin Dynamic rheometer at 235° C. and 5% strain rate. Nanoclay content was determined by thermogravimetric analysis (TGA) using a TG50 instrument from Mettler Toledo, Inc. Slide press-outs were generated with the Carver compression press. Tensile properties were measured on an Instron 3345 Universal Material Testing Machine according to ASTM D-638. Randomly selected pelletized pellets were injection molded into specimens according to ASTM D-638 for tensile property examination. Additionally random samples were picked to produce mechanical compressed molded disks for dynamic rheology testing and for X-Ray Diffraction images. SEM's were provided courtesy of Polyone Corporation, and XRD's were performed by Ashland Chemicals.

Figure 20:
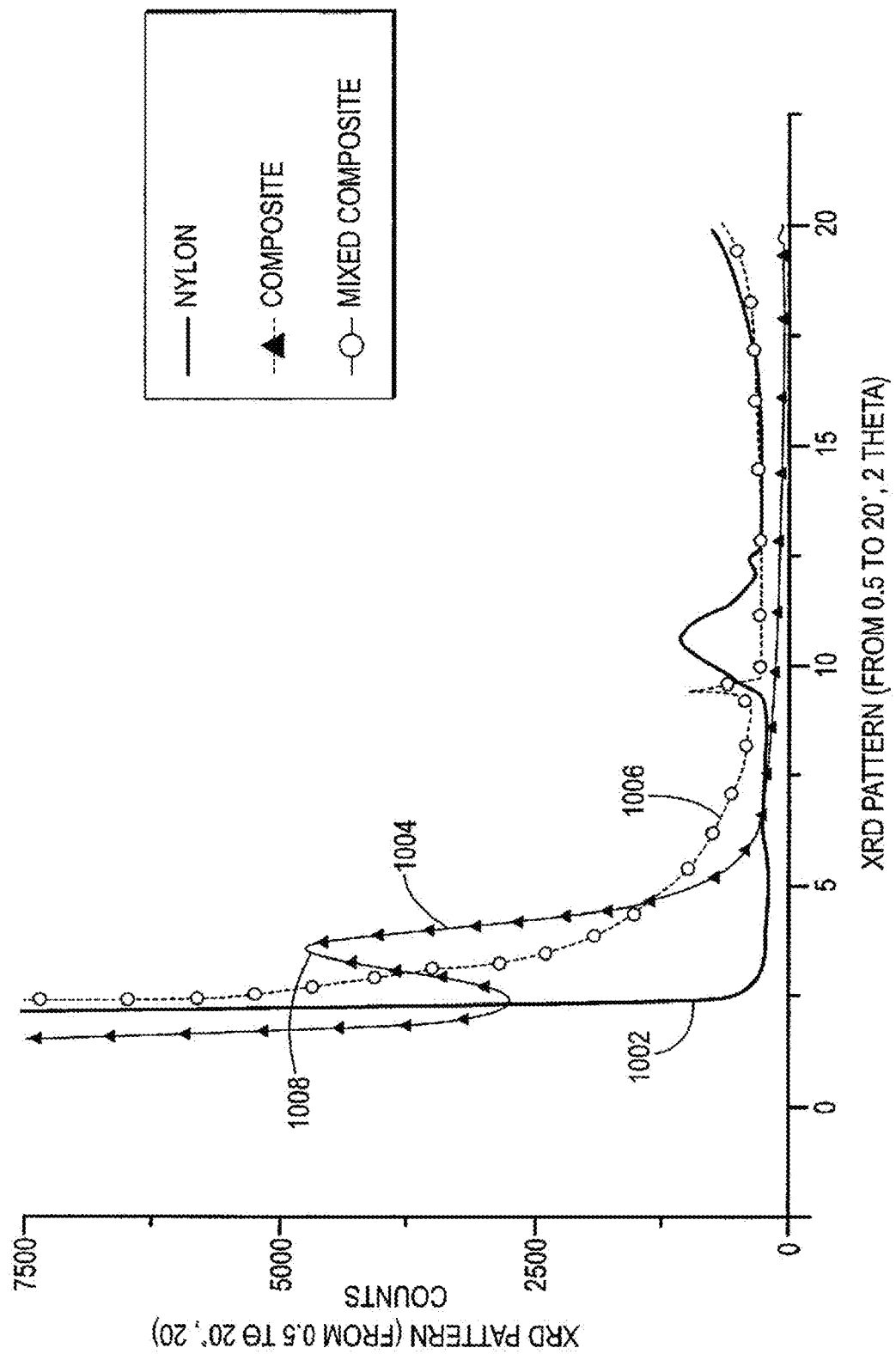

Full, even dispersion was achieved. A standard test for determining the efficiency of the dispersion of nanoclay particles is the non-destructive X-Ray Diffraction (XRD) test. The XRD test measures the degree of dispersion by measuring the scattered light pattern formed when a scan of X-Ray beams encounters the composite. These measurements are used to estimate the distance between individual platelets after compounding. The result is that the greater and more even the dispersion, the fewer "reflections" (manifested as "peaks" on the graph below), indicating the more complete and even the dispersion. FIGS. 20 and 21 show XRD data illustrating distance spacings for the particles before and after extensional flow processing. The increases in the "d-space" confirm that the PA-6 matrix material successfully interacted with the particles, thereby forming a true exfoliated composite material. FIG. 20 shows graphically a comparison of XRD pattern measurements, from 0.5 to 20-degree, 2 theta, of three polymer composites. Line 1002 represents Nylon Bergamid B70 extruded in an extruder without nanoclay. Each XRD powder pattern was collected with a panalytical X, Pert Pro MD System using a copper X-Ray source operating at 45 KV/40 mA. An in-line nickel filter was positioned on the diffracted beam side of the insrument to reduce CuKβ signal contribution in the collected powder pattern.

Line 1004 represents Nylon Bergamid B70 with Nanomer I30P nanoclay mixed in the same extruder as above at an 8% concentration. Line 1006 represents the composite graphed in line 1004 further mixed in a two-stage mixer described below.

A high degree of exfoliation is evidenced by the absence of x-ray reflections. The reduced area under curve 1006, compared to curve 1004, evidences that the clay has been exfoliated. The increase in d-spacing shown in FIG. 21 is evidence that intercalation was achieved. Peak 1008 is the nanoclay reflection, in the composite extruded without additional mixing, in the vicinity of 4 Å (Angstroms). The reflection does not appear in the two-stage treated material indicating that the clay material was evenly dispersed.

EXAMPLE 7

Improved Color Mixing with Thermally Sensitive Pigments

Basell polypropylene homopolymer (PP) with a melt flow rate of 12.5 dg/min (130° C., 2.16 kg) was mixed with blue and yellow masterbatches. The blue masterbatch was a Munsell standard blue color masterbatch provided by Ampacet in pellet form. It has an LDPE base and a mixture of organic and inorganic pigments. The yellow masterbatch was a Lansco Colors yellow iron hydroxide (Fe2O3.H2O) in powder form. This colorant is a temperature and shear sensitive material and starts to partially dehydrate at 195° C., producing iron oxide (α-Fe2O3) giving a reddish color appearance. The materials were dry-blended at room temperature in a proportion of 99.25% PP, 0.25% blue and 0.50% yellow pellets.

First, the composition was extruded in a 1-inch (25 mm), 24:1 L/D Davis-Standard single-screw extruder equipped with an Xaloy nanomixer screw and pelletized. Then, the extruder was directly coupled to a 50 mm extensional flow mixer and comparative pellets were produced.

Second, the composition was extruded in a co-rotating Werner Pfleider ZSK 30, 30 mm diameter, 38:1 L/D twin-screw extruder. Then, the extruder was directly coupled to a 50 mm extensional flow mixer and comparative pellets were produced.

The single-screw extruder was operated at a rotational speed of 120 RPM and 180° C. barrel temperature. The extensional flow mixer initially operated at a rotational speed of 75 RPM with a 175° C. barrel temperature. Mixer rotor speeds of 100, 125 and 150 RPM were tested, and barrel temperatures as low as 150° C. were also successfully tested.

Pellets were compression molded into 150 mm×150 mm plaques for color measurement and pressed into films to measure particle sizes microscopically. The laboratory equipment used to test the samples included a Dynisco LCR7000 capillary rheometer equipped with a 30:1 capillary. Plaque press-outs were generated using a Carver compression press. Microscopy was done using a National optical microscope employing 100× magnification and software Motic Images Plus 2.0 for measuring the particle sizes. Color measurements were performed with a BYK-Gardner 6834 Spectro-guide employing the CIE L*a*b*-System. Color readings were taken from the compression molded plaques using standard BykGardner prescribed techniques. An average of six measurements of each of the following CIE L*a*b* types were taken for each data point. The standard CIE L*a*b* diagram shows 3 axis measurement depicting the green to red scale (a*), the yellow to blue scale (b*), and the "lightness" scale (L*). Red is measured on the (+a*) axis, green is measured on the (−a*) axis, yellow is measured on the (+b*) axis, and blue is measured on the (−b*) axis. In all cases, the integer measurement number represents the color intensity. Standard deviations of these color measurements were also determined to reflect the degree of color homogeneity from sample to sample. Furthermore, in the case of poorly mixed colors, actual color measurement readings would be inaccurate, because the colors in the test plaques varied and "swirled" throughout the sample. Samples with such wide color variations are identified as "poorly mixed colors."

Particle size measurements are represented in Table 8. In each sample, the largest visible particles were measured, compared, digitally tagged in photographs, and recorded. At least eight large particles were identified and measured for each of the samples. Samples A-G were produced by processing with both an extruder and the extensional flow mixer. Sample H was produced using the single-screw extruder only, and sample I was produced using the twin-screw extruder only. The pellets produced with the single-screw extruder had average particle size (62 μm) twice as large as pellets produced by the other methods.

TABLE 8

| Sample ID | Processing Speed (RPM) | Barrel Temp. (deg. C.) | Largest average particle size, (μm) |
|---|---|---|---|
| A (x) | 75 | 175 | 32 +/− 6 |
| B (x) | 100 | 175 | 26 +/− 5 |
| C (x) | 100 | 175 | 22 +/− 3 |
| D (x) | 125 | 175 | 35 +/− 8 |
| E (x) | 125 | 160 | 27 +/− 5 |
| F (x) | 150 | 160 | 25 +/− 5 |
| G (x) | 150 | 150 | 30 +/− 7 |
| H (y) | 120 | 180 | 62 +/− 6 |
| I (z) | 100 | 190 | 26 +/− 3 |

(x) Single-Screw extruder with Extensional Flow mixer
(y) Single Screw Extruder without Extensional Flow mixer
(z) Twin Screw extruder without Extensional Flow mixer Color measurements are presented in Table 9. Sample A was measured, and also perceived to be, the greenest and most homogeneous color mix produced. Sample A had the highest green and yellow measurements as well as the lowest standard deviations. Sample A was produced at the slowest mixer speed.

TABLE 9

| Sample ID | L* Lightness average | L* Std. dev. | a* + red − green Avg | a* Std. dev. | b* + yellow − blue Avg | b* Std. dev. |
|---|---|---|---|---|---|---|
| A (x) | 45.35 | 0.57 | −11.72 | 0.55 | 11.06 | 0.55 |
| B (x) | 45.92 | 0.24 | −9.48 | 1.72 | 12.34 | 2.7 |
| C (x) | 45.33 | 0.92 | −7.63 | 1.92 | 13.85 | 3.35 |
| D (x) | 44.72 | 0.9 | 0.23 | 2.31 | 18.84 | 2.29 |
| E (x) | 45.8 | 0.54 | −8.63 | 1.32 | 13.53 | 2.03 |
| F (x) | 45.46 | 1.34 | −7.11 | 2.95 | 14.2 | 2.38 |
| G (x) | 45.46 | 0.83 | −8.74 | 1.61 | 12.45 | 2.52 |
| H (y) | Poorly mixed colors | Poorly mixed colors | Poorly mixed colors | Poorly mixed colors | Poorly mixed colors | Poorly mixed colors |
| I (z) | Poorly mixed colors | Poorly mixed colors | Poorly mixed colors | Poorly mixed colors | Poorly mixed colors | Poorly mixed colors |

Because the shear-generated heat increased proportionally with rotational speed, ultimately a brown shade in the extrudate was observed. This condition was especially pronounced in sample D, which combines high temperature settings with high speed, indicating that while increased speed reduced particle sizes, it also increased the red and yellow measurements.

Overall, the samples produced with the extensional flow mixer exhibited particle sizes similar to those produced by a twin-screw extruder. The extensional flow mixer was designed to operate with comparatively large clearance gaps between the rotating member (rotor) and the non-rotating barrel housing (stator). A minimum processing gap of 1 mm created an average 130 $sec^{-1}$ shear rate (at 100 RPM) with maximum 266 $sec^{-1}$ and minimum 46 $sec^{-1}$. The shear field was arranged with gradual intensity increases from a thinner machine entrance to a diameter three times larger at the exit of the mixer. The shear stress works in combination with extensional stress, applied to the melt in the mixer's chamber as a result of the interaction of the melted material with multiple converging-diverging features located on the rotor and stator walls. The extensional rate in the middle part of the conical machine varies between −50 $sec^{-1}$ and +50 $sec^{-1}$ at 100 RPM, relative to specific points located in the mixing chamber.

Sample H was produced by a single-screw extruder and sample I was produced by a twin-screw extruder. Precision optical measurements could not be taken doe to the high level of variation. These samples are identified in Table 1 as "Poorly Mixed Colors". Optimization of the temperature profile and rotation speed (RPM) did not improve the performance of the extruders for mixing the colorants onto the PP matrix enough to enable color measurement. Without the extensional flow mixer, neither the single-screw extruder with the nano-mixer nor the twin-screw extruder could provide good distributive mixing.

Small extruders have limitations, consistently feeding low concentrations of masterbatch and concentrate additives. When blue masterbatch is let down to 0.25% into any polyolefin, it provides an intense blue color, but this process is very challenging for small extruders due to the large ratio of polymer to additive pellets. For example, in this case a concentration of blue color masterbatch in PP corresponds to a one granule of blue color masterbatch blended with 647 granules of PP, or one granule of blue color masterbatch blended into 29 cm$^3$ of bulk pelletized PP. As this pellet blend reaches the rotating screw of the extruder, the extruder flights spatially separate the concentrate pellets resulting in highly variable additive concentrations in the extrudate. In the case of color concentrates, this variation is highly visible. At production rates, the single screw extruder makes 3.85 revolutions at 100 RPM per one color pellet added, and the twin screw extruder makes 9.60 revolutions at 250 RPM per one color pellet added.

EXAMPLE 8

Improved Color Mixing

A blue and yellow composition as described with reference to Example 7 was mixed and extruded in a Sterling 2" single screw extruder having a 24:1 L:D ratio and a single stage screw. The feed section of the extruder was set to deliver 25 lbs/hr. The extruder screw was to rotate at 50 RPM at 180° C. barrel temperature.

Samples of molten composition were taken at ports located at the center of the second stage of the two-stage mixer and at the end of the mixer, at two rotor speeds. The samples were immediate pelletized. A minimum processing gap of 1 mm between the rotor and the stator created an average 130 sec$^{-1}$ shear rate at 100 RPM with maximum and minimum shear rates, respectively, of 266 sec$^{-1}$ and 46 sec$^{-1}$.

Samples A and C were produced at a rotor speed of 50 RPM and 150° C. barrel (stator) temperature. Melt temperature averaged 173° C. Sample A was obtained from the center port and sample C was obtained from the end port. Samples D and F were produced at a rotor speed of 125 RPM with the remaining conditions unchanged. Sample D was obtained from the center port and sample F was obtained from the end port. Melt temperature averaged 169° C.

Press-outs were produced with the Carver press and the color variation of the press-outs was measured with the Gardner spectrophotometer. Center port samples (A and D) exhibited more variation than end port samples (C and F) as shown in Table 10.

TABLE 10

| Sample | L* AVG | L* STDEV | a* AVG | a* STDEV | b* AVG | b* STDEV |
|---|---|---|---|---|---|---|
| 50 RPM | | | | | | |
| A | 46.36 | 0.82 | −13.04 | 0.79 | 10.15 | 3.58 |
| C | 46.40 | 0.60 | −12.76 | 0.66 | 11.16 | 2.06 |
| 125 RPM | | | | | | |
| D | 47.29 | 0.62 | −10.87 | 1.00 | 15.36 | 2.58 |
| F | 46.79 | 0.57 | −12.24 | 0.49 | 12.31 | 1.95 |

The flow field inside the mixer was simulated with COMPUPLAST 3D Finite Element Method (FEM) software. The events are calculated as described previously with reference to the method of calculating the number of events in the model 50 mixer. In the case of samples A and C, the three particle average number of events at the 50%, 75% and 100% positions are 8.17, 10.33 and 11.33, respectively, resulting in 147, 93, and 102 events per section for a total of 342 events. For samples D and F, the averages are 18, 24 and 32 resulting and 324, 216 and 240 events per section for a total of 780 events as previously disclosed.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. A mixing process comprising the steps of:
providing a mixer including a rotor supported within a bore, the rotor comprising a plurality of flow restrictors disposed on its surface in a regulated pattern;
providing a molten polymer composition in a pressurized state to the mixer; and
rotating the rotor to generate at least 100 modulating events as the molten polymer composition flows over the flow restrictors to form a modulated composition, wherein
the molten polymer composition has a relaxation time; and
the cycle time for the shear stress field intensity change associated with the at least 100 modulating events occurs with a frequency similar to the relaxation time of the molten polymer composition.

2. A process as in claim 1, wherein the flow restrictors have distal ends which define a gap between the flow restrictors and an internal surface of the bore, and wherein the gap distance is at least 0.3 mm.

3. A process as in claim 1, wherein the mixer is sized and configured to generate the modulating events with less than 600 psi of pressure.

4. A process as in claim 1, wherein each modulating event comprises a shear rate between 200 sec −1 and 1,000 sec −1 in a shear field with a resulting stress of between 20,000 and 100,000 Pa.

5. A process as in claim 1, wherein the molten composition provided to the mixer includes large particles having an average size and small particles, the large particles being larger than, and discernible from, the small particles, and wherein the modulating events reduce the average size by at least 50%.

6. A process as in claim 1, wherein the flow restrictors comprise pockets disposed on the surface of the rotor.

7. A process as in claim 6, wherein each pocket is defined by four walls extending from the rotor surface.

8. A process as in claim 1, wherein the molten polymer composition comprises fibers.

9. A process as in claim 1, wherein the molten polymer composition comprises one or more materials selected from pigments, dies, and colorants.

10. A process as in claim 1, wherein the molten polymer composition comprises nanoparticles.

11. A process as in claim 1, wherein the molten polymer composition comprises thermoplastic polymer.

12. A process as in claim 11, wherein the thermoplastic polymer comprises polyamide.

13. A process as in claim 1, wherein the molten polymer composition comprises inorganic material.

14. A process as in claim 1, wherein:
the provided molten polymer composition comprises particles having an initial average particle size; and
the exposure of the molten polymer composition to the at least 100 modulating events results in the modulated composition comprising particles having a reduced average particle size relative the initial average particle size.

15. A process as in claim 1, wherein the bore comprises a plurality of flow restrictors disposed on the surface of the bore in a regulated pattern.

16. A process as in claim 15, wherein the flow restrictors comprise pockets disposed on the surface of the rotor and the surface of the bore.

17. A process as in claim 16, wherein each pocket disposed on the surface of the rotor is defined by four walls extending from the surface of the rotor and each pocket disposed on the surface of the bore is defined by four walls extending from the surface of the bore.

18. A mixing process comprising the steps of:
providing a mixer including a rotor supported within a bore, the rotor comprising a plurality of flow restrictors disposed on its surface in a regulated pattern;
providing a molten polymer composition in a pressurized state to the mixer; and
rotating the rotor to generate at least 100 modulating events as the molten polymer composition flows over the flow restrictors to form a modulated composition, wherein the molten composition provided to the mixer includes nanotubes at a first concentration, the modulating events distribute the nanotubes in the molten polymer composition such that the modulated composition resulting therefrom is operable to impart a surface resistance in a first product made from the modulated composition, the order of magnitude of the surface resistance being equal to, or greater than, the order of magnitude of a second surface resistance of a second product made from a second molten polymer composition similar to the first composition except that the second composition includes the nanotubes at a second concentration which is at least 20% greater than the first concentration and the second composition is made without the least 100 modulating events.

* * * * *

UNITED STATES PATENT AND TRADEMARK OFFICE
CERTIFICATE OF CORRECTION

| | | |
|---|---|---|
| PATENT NO. | : 8,313,051 B2 | Page 1 of 1 |
| APPLICATION NO. | : 12/399010 | |
| DATED | : November 20, 2012 | |
| INVENTOR(S) | : Alan Stall et al. | |

It is certified that error appears in the above-identified patent and that said Letters Patent is hereby corrected as shown below:

Column 26, lines 48-49, the phrase "wherein the gap distance is" should be -- wherein the gap is --.

Column 26, line 57, the phrase "the molten composition" should be -- the molten polymer composition --.

Column 28, line 13, the phrase "the molten composition" should be -- the molten polymer composition --.

Signed and Sealed this
Twenty-second Day of January, 2013

David J. Kappos
*Director of the United States Patent and Trademark Office*